United States Patent
Abbott, Jr. et al.

(10) Patent No.: US 11,007,710 B2
(45) Date of Patent: May 18, 2021

(54) THREE-DIMENSIONAL (3D) PRINTING

(71) Applicant: Hewlett-Packard Development Company, L.P., Houston, TX (US)

(72) Inventors: James Elmer Abbott, Jr., Albany, OR (US); Raymond Adamic, Corvallis, OR (US); David A. Champion, Lebanon, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 205 days.

(21) Appl. No.: 15/568,969

(22) PCT Filed: Jul. 24, 2015

(86) PCT No.: PCT/US2015/041961
§ 371 (c)(1),
(2) Date: Oct. 24, 2017

(87) PCT Pub. No.: WO2017/018985
PCT Pub. Date: Feb. 2, 2017

(65) Prior Publication Data
US 2018/0147777 A1    May 31, 2018

(51) Int. Cl.
*B29C 64/135* (2017.01)
*B33Y 70/00* (2020.01)
(Continued)

(52) U.S. Cl.
CPC ............ *B29C 64/135* (2017.08); *B22F 10/10* (2021.01); *B29C 64/112* (2017.08);
(Continued)

(58) Field of Classification Search
CPC .................................................. B29C 64/245
See application file for complete search history.

(56) References Cited

U.S. PATENT DOCUMENTS

| 5,204,055 A | 4/1993 | Sachs et al. |
| 5,660,621 A | 8/1997 | Bredt |

(Continued)

FOREIGN PATENT DOCUMENTS

| CN | 1950192 | 4/2007 |
| CN | 1976799 | 6/2007 |

(Continued)

OTHER PUBLICATIONS

Li et al., "Synthesis and Infrared Study of Nanosized Aluminum Nitride Powders Prepared by Direct Current Arc Plasma", J. Phys. Chem. B, 1998, 102, 8692-8695.

(Continued)

*Primary Examiner* — Jacob T Minskey
*Assistant Examiner* — Jennifer A Kessie
(74) *Attorney, Agent, or Firm* — Dierker & Kavnaugh PC

(57) ABSTRACT

In a 3D printing method, a first layer of a build material is applied. A part layer is patterned by selectively applying a penetrating liquid functional material (PLFM) on at least a portion of the first layer. The PLFM includes (in amounts by weight based on total wt % of the PLFM): from about 5%-15% of a first metal oxide nanoparticle having a particle size ranging from about 0.5 nm up to 10 nm, from about 0.25%-10% of a second metal oxide nanoparticle having at least one dimension greater than 10 nm, from about 1%-10% of an electromagnetic radiation absorber, from about 5%-50% of an organic solvent, a surfactant, and a balance of water. The first layer having the PLFM applied thereon is exposed to electromagnetic radiation, whereby the portion of the first layer at least partially fuses to form the part layer.

20 Claims, 8 Drawing Sheets

(51) Int. Cl.
  *B33Y 30/00* (2015.01)
  *B33Y 10/00* (2015.01)
  *B29C 64/165* (2017.01)
  *C09D 11/322* (2014.01)
  *G03G 15/22* (2006.01)
  *B22F 10/10* (2021.01)
  *B29C 64/112* (2017.01)

(52) U.S. Cl.
  CPC ............ *B29C 64/165* (2017.08); *B33Y 10/00* (2014.12); *B33Y 30/00* (2014.12); *B33Y 70/00* (2014.12); *C09D 11/322* (2013.01); *G03G 15/224* (2013.01); *B22F 2999/00* (2013.01); *G03G 15/225* (2013.01)

(56) References Cited

U.S. PATENT DOCUMENTS

| | | | |
|---|---|---|---|
| 6,277,183 | B1 * | 8/2001 | Johnson ............ C09D 11/38 106/31.27 |
| 6,537,358 | B1 | 3/2003 | Horiuchi |
| 8,163,077 | B2 | 4/2012 | Eron et al. |
| 8,348,411 | B2 | 1/2013 | Brust et al. |
| 8,784,549 | B2 | 7/2014 | Bermel |
| 8,784,550 | B2 | 7/2014 | Kasperchik |
| 2005/0049739 | A1 * | 3/2005 | Kramer ............ B33Y 10/00 700/119 |
| 2007/0238056 | A1 | 10/2007 | Baumann et al. |
| 2007/0241482 | A1 | 10/2007 | Giller et al. |
| 2008/0257204 | A1 | 10/2008 | Oriakhi et al. |
| 2009/0004445 | A1 | 1/2009 | Park et al. |
| 2009/0163615 | A1 | 6/2009 | Halahmi et al. |
| 2012/0247365 | A1 | 10/2012 | Lussier |
| 2013/0026683 | A1 | 1/2013 | Ng et al. |
| 2013/0160672 | A1 | 6/2013 | Kasperchik |
| 2013/0284050 | A1 | 10/2013 | Adamic |
| 2014/0036455 | A1 | 2/2014 | Napadensky |
| 2015/0035209 | A1 | 2/2015 | Shah et al. |
| 2015/0069649 | A1 | 3/2015 | Bai et al. |
| 2015/0152239 | A1 | 6/2015 | Guilera Grandes et al. |

FOREIGN PATENT DOCUMENTS

| | | |
|---|---|---|
| EP | 1498277 | 1/2005 |
| EP | 3200980 | 8/2017 |
| WO | WO-2009017648 | 2/2009 |
| WO | WO-2014068579 | 5/2014 |
| WO | WO-2015108543 | 7/2015 |
| WO | WO-2016053305 A1 | 4/2016 |

OTHER PUBLICATIONS

Son et al "Spreading of inkjet droplet of non-Newtonian fluid on solid surface with controlled contact angle at low Weber and Reynolds numbers", J. of Non-Newtonian Fluid Mech, 162 (2009) 78-87.

* cited by examiner

THREE-DIMENSIONAL (3D) PRINTING

BACKGROUND

Three-dimensional (3D) printing may be an additive printing process used to make three-dimensional solid parts from a digital model. 3D printing is often used in rapid product prototyping, mold generation, and mold master generation. 3D printing techniques are considered additive processes because they involve the application of successive layers of material. This is unlike traditional machining processes, which often rely upon the removal of material to create the final part. Materials used in 3D printing often require curing or fusing, which for some materials may be accomplished using heat-assisted sintering, and for other materials may be accomplished using digital light projection technology.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 2A, 2B, 2D, and 2E are cross-sectional views which together depict another example of the 3D printing method disclosed herein;

FIGS. 2A-2C, 2F, and 2G are cross-sectional views which together depict still another example of the 3D printing method disclosed herein;

FIGS. 2A, 2B, 2H, and 2I are cross-sectional views which together depict still another example of the 3D printing method disclosed herein;

FIGS. 3A, 3B, 3F, and 3G are cross-sectional views which together depict still another example of the 3D printing method disclosed herein;

DETAILED DESCRIPTION

Examples of the three-dimensional (3D) printing method disclosed herein utilize multi jet fusion (MJF). During multi jet fusion, an entire layer or several layers of a build material (also referred to as build material particles) is/are exposed to radiation, but a selected region (in some instances less than the entire layer(s)) of the build material is fused and hardened to become a layer or several layers of a 3D object/part. In examples disclosed herein, a penetrating liquid functional material is selectively deposited in contact with the selected region of the build material. The penetrating liquid functional material is capable of penetrating into the layer of the build material and spreading onto the exterior surface of the build material and substantially uniformly throughout the build material layer. The penetrating liquid functional material contains an energy absorber. As such, the penetrating liquid functional material is capable of absorbing electromagnetic radiation and converting the absorbed radiation to thermal energy, which in turn melts or sinters the build material that is in contact with the penetrating liquid functional material. This causes the build material to fuse, bind, cure, etc. to form the layer of the 3D object/part with enhanced interlayer bonding and strengthened mechanical properties.

Examples of the penetrating liquid functional material have non-Newtonian fluid properties. The non-Newtonian fluid properties of the penetrating liquid functional material create a reduced viscosity under sheer or thermal forces when ejected from a printhead. This enables the penetrating liquid functional material to be printed via an inkjet printer. Once the penetrating liquid functional material exits the printhead, it is able to quickly migrate and substantially uniformly disperse throughout the build material powder. The penetrating liquid functional material can penetrate across several build material layers, and thus deliver the energy absorber across voxel boundaries. This leads relatively homogeneous spreading of the energy absorber across the layers, which can improve thermal uniformity during fusing, which in turn leads to improved part uniformity. Also after exiting the printhead and spreading throughout the build material layer, the viscosity of the penetrating liquid functional material increases and may form a structured network, which can improve the mechanical properties of the 3D object/part that is formed.

In some instances, the penetrating liquid functional material may be uniformly distributed on and/or within the build material powder that is on top of a previously cured layer of build material. In these instances, the penetrating liquid functional material can penetrate through to the surface of the underlying cured layer, and this may enhance the bond between the newly cured layer and the previously cured layer.

Figure 1:
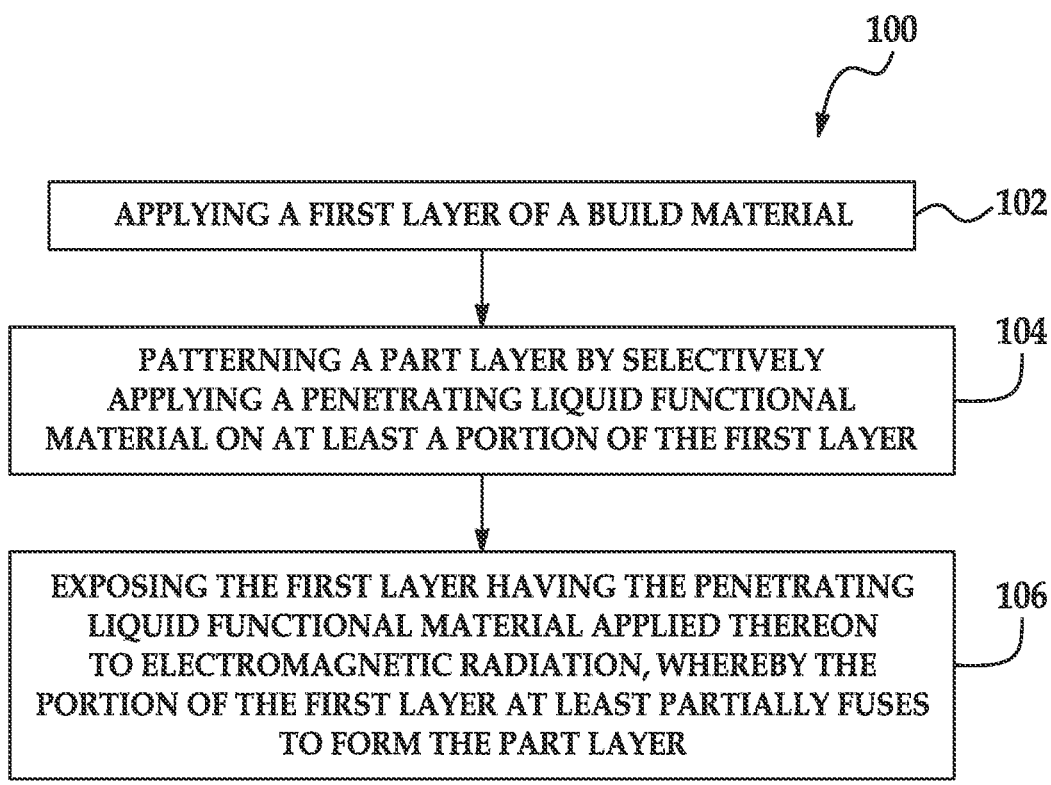
FIG. 1 is a flow diagram illustrating an example of a 3D printing method disclosed herein.

An example of the 3D printing method 100 is depicted in FIG. 1. It is to be understood that the method 100 shown in FIG. 1 will be discussed in detail herein. Along with the method 100, FIGS. 2A-2C will be described.

As shown at reference numeral 102 of FIG. 1, the method 100 includes applying a first layer of a build material. An example of the application of the first layer of build material is shown in cross-section at FIG. 2A. In the example shown in FIG. 2A, one layer 10 of the build material 16 has been applied, as will be discussed in more detail below.

The build material 16 may be a powder, a liquid, a paste, or a gel. Examples of the build material 16 include ceramic particles. Examples of suitable ceramic particles include oxides, carbides, and nitrides. Some specific examples include alumina ($Al_2O_3$), glass, silicon mononitride (SiN), silicon dioxide ($SiO_2$), zirconia ($ZrO_2$), titanium dioxide ($TiO_2$), or combinations thereof. As an example, 30 wt % glass may be mixed with 70 wt % alumina. Other examples of the build material 16 include semi-crystalline thermoplastic materials with a wide processing window of greater than 5° C. (i.e., the temperature range between the melting point and the re-crystallization temperature). Some specific examples of the build material 16 include polyamides (PAs) (e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc.). Other specific examples of the build material 16 include polyethylene, polyethylene terephthalate (PET), and an amorphous variation of these materials. Still other examples of suitable build materials 16 include polystyrene, polyacetals, polypropylene, polycarbonate, polyester, thermal polyurethanes, other engineering plastics, and blends of any two or more of the polymers listed herein. Core shell polymer particles of these materials may also be used.

The build material 16 may have a melting point ranging from about 50° C. to about 2100° C. As examples, alumina particles having a melting point of 2072° C. may be used, glass having a melting point ranging from about 200° C. to about 1700° C. may be used, a polyamide having a melting point of 180° C. may be used, or thermal polyurethanes having a melting point ranging from about 100° C. to about 165° C. may be used.

The build material 16 may be made up of similarly sized particles or differently sized particles. In the examples shown herein, the build material 16 includes particles of two different sizes.

The term "size" or "particle size" is used herein to describe at least the build material 16, smaller metal oxide nanoparticles, and larger metal oxide nanoparticles. The size, particle size, or primary particle size generally refers to the diameter or average diameter, which may vary, depending upon the morphology of the individual particle. In an example, the respective particle may have a morphology that is substantially spherical. A substantially spherical particle (i.e., spherical or near-spherical) has a sphericity of >0.84. Thus, any individual particles having a sphericity of <0.84 are considered non-spherical (irregularly shaped). The particle size of the substantially spherical particle may be provided by its largest diameter, and the particle size of a non-spherical particle may be provided by its average diameter (i.e., the average of multiple dimensions across the particle) or by an effective diameter, which is the diameter of a sphere with the same mass and density as the non-spherical particle. In another example, the respective particle may have a morphology that is fibrous. A fibrous particle is like an elongated particle having a length that is greater than its diameter/particle size. In still another example, the respective particle may have a morphology that is a chain. The chain is made up of individual particles that are aggregated together similar to a string of pearls. The length of the chain is greater than the diameter/particle size of any individual particle in the chain. Still further, the particles may be agglomerated together as a cluster. The cluster may have a secondary particle size, which is the diameter of the agglomeration (not the individual particles in the agglomeration).

In an example, the average size of the particles of the build material 16 ranges from 10 nm to about 100 µm. In another example, the build material 16 is a particle having a particle size ranging from about 1 µm to about 60 µm.

It is to be understood that build material 16 may include, in addition to the ceramic or polymer particles, a charging agent, a flow aid, or combinations thereof. Charging agent(s) may be added to suppress tribo-charging. Examples of suitable charging agent(s) include aliphatic amines (which may be ethoxylated), aliphatic amides, quaternary ammonium salts (e.g., behentrimonium chloride or cocamidopropyl betaine), esters of phosphoric acid, polyethylene glycol esters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the charging agent is added in an amount ranging from greater than 0 wt % to less than 5 wt % based upon the total wt % of the build material 16.

Flow aid(s) may be added to improve the coating flowability of the build material 16. Flow aid(s) may be particularly desirable when the particles of the build material 16 are less than 25 µm in size. The flow aid improves the flowability of the build material 16 by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminium silicate (E555), calcium aluminosilicate (E556), bentonite (E558), aluminium silicate (E559), stearic acid (E570), or polydimethylsiloxane (E900). In an example, the flow aid is added in an amount ranging from greater than 0 wt % to less than 5 wt % based upon the total wt % of the build material 16.

Figure 2A:
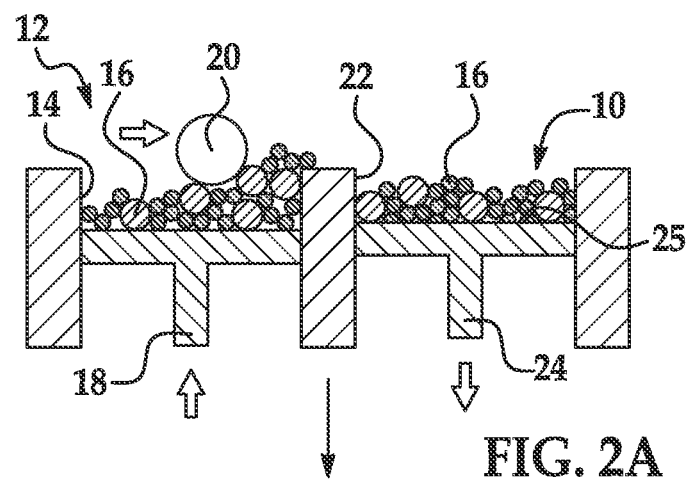
FIGS. 2A-2C are cross-sectional views depicting the example of the method shown in FIG. 1.

In the example shown in FIG. 2A, a printing system 12 for forming the 3D object/part includes a supply bed 14 (including a supply of the build material 16), a delivery piston 18, a roller 20, a fabrication bed 22 (having a contact surface 25), and a fabrication piston 24. Each of these physical elements may be operatively connected to a central processing unit (not shown) of the printing system 12. The central processing unit (e.g., running computer readable instructions stored on a non-transitory, tangible computer readable storage medium) manipulates and transforms data represented as physical (electronic) quantities within the printer's registers and memories in order to control the physical elements to create the 3D object. The data for the selective delivery of the build material 16, the penetrating liquid functional material, etc. may be derived from a model of the 3D object to be formed.

The delivery piston 18 and the fabrication piston 24 may be the same type of piston, but are programmed to move in opposite directions. In an example, when a first layer of the 3D object is to be patterned or formed, the delivery piston 18 may be programmed to push a predetermined amount of the build material 16 out of the opening in the supply bed 14 and the fabrication piston 24 may be programmed to move in the opposite direction of the delivery piston 18 in order to increase the depth of the fabrication bed 22. The delivery piston 18 will advance enough so that when the roller 20 pushes the build material 16 into the fabrication bed 22 and onto the contact surface 25, the depth of the fabrication bed 22 is sufficient so that a layer 10 of the build material 16 may be formed in the bed 22. The roller 20 is capable of spreading the build material 16 into the fabrication bed 22 to form the layer 10, which is relatively uniform in thickness. In an example, the thickness of the layer 10 ranges from about 90 µm to about 110 µm, although thinner or thicker layers may also be used. For example, the thickness of the layer 10 may range from about 50 µm to about 1 mm. In an example, the layer 10 thickness ranges from about 100 µm to about 200 µm.

It is to be understood that the roller 20 may be replaced by other tools, such as a blade that may be desirable for spreading different types of powders, or a combination of a roller and a blade.

Figure 2B:
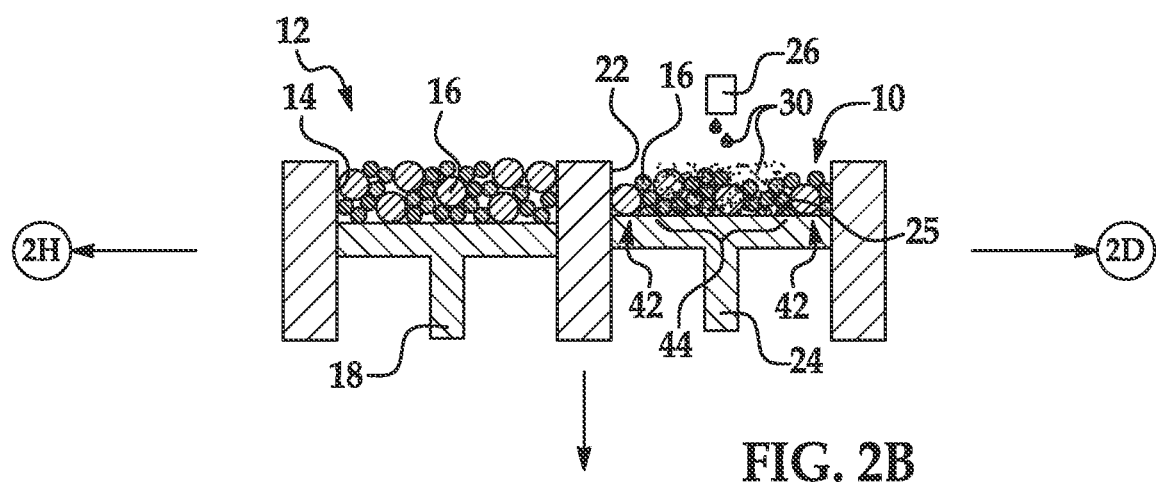

After applying the first layer 10 of build material 16, a part layer is patterned. The part layer is patterned by selectively applying the penetrating liquid functional material 30 on at least a portion of the build material 16 in the first layer 10, as shown at reference number 104 in FIG. 1 and in FIG. 2B. As illustrated in FIG. 2B, the penetrating liquid functional material 30 may be dispensed from an inkjet printhead 26. While a single printhead 26 is shown in FIG. 2B, it is to be understood that multiple printheads may be used that span the width of the fabrication bed 22. The printhead 26 may be attached to a moving XY stage or a translational carriage (neither of which is shown) that moves the printhead 26 adjacent to the fabrication bed 22 in order to deposit the penetrating liquid functional material 30 in desirable area(s).

The printhead 26 may be programmed to receive commands from the central processing unit and to deposit the penetrating liquid functional material 30 according to a pattern of a cross-section for the part layer of the 3D object that is to be formed. As used herein, the cross-section of the part layer of the object to be formed refers to the cross-section that is parallel to the contact surface 25. In the example shown in FIG. 2B, the printhead 26 selectively applies the penetrating liquid functional material 30 on those portion(s) (e.g., portion 44) of the first layer 10 that is/are to be fused to become the part layer of the 3D object. As an example, if the layer is to be shaped like a cube or cylinder, the penetrating liquid functional material 30 will be deposited in a square pattern or a circular pattern (from a top view), respectively, on at least a portion of the first layer 10 of the build material 16. In the example shown in FIG. 2B, the penetrating liquid functional material 30 is deposited in a square pattern on the portion 44 of the first layer 10 and not on the portions 42.

The penetrating liquid functional material 30 may be used to enhance interlayer bonding and strengthen the mechanical properties of the 3D object. This may be due, in part, to the ability of the penetrating liquid functional material 30 to migrate and disperse uniformly throughout the first layer 10 of the build material 16.

The penetrating liquid functional material 30 may be a non-Newtonian inkjet ink that has a dynamic viscosity at various shear rates (e.g., viscosity can be measured to indirectly show network formation or aggregation in the ink), a pH relative to the isoelectric point of one of the ink solids (e.g., pH at or above the isoelectric point of one of two different types of metal oxide nanoparticles can provide a desirable balance of charge density), and/or a conductivity ranging from about 100 μS/cm to about 2000 μS/cm (which facilitates enhanced stability over inks with higher conductivity).

The present penetrating liquid functional material 30 can be inkjet printed, as the viscosity of the penetrating liquid functional material 30 can be lowered using shear or thermal forces within the inkjet printhead 26. Once exiting the printhead 26, the penetrating liquid functional material rapidly spreads throughout the build material layer 10, and the viscosity of the present penetrating liquid functional material 30 rapidly increases (e.g. within about 1 second to about 30 seconds) via self-assembly of the structured network within the penetrating liquid functional material 30. Generally, the structured network within the penetrating liquid functional material 30 can be assembled through interaction between two different metal oxide nanoparticles and, in some instances, other charged particles. The two different metal oxide nanoparticles will be described in more detail below.

Regarding viscosity, as discussed herein, the viscosity for non-Newtonian fluids are not discrete but change based on the physical energy applied to the fluid. As used herein, "viscosity" refers to dynamic viscosity unless otherwise stated. For the penetrating liquid functional material 30, the viscosity can generally be measured at two states: proximate in time to an at rest state; i.e., with a minimum shear applied to the penetrating liquid functional material 30 (shear rate as low as 5 $s^{-1}$), and proximate in time to a processing state; i.e., with a significant shear applied to the penetrating liquid functional material 30 (shear rate of at least 10,000 $s^{-1}$ before the firing chamber of the printhead 26, and 500,000 $s^{-1}$ or higher in the firing chamber of the printhead 26). In one example, the penetrating liquid functional material 30 can have a dynamic viscosity ranging from 5 cps to 10,000 cps at a temperature of 25° C. and a shear rate of 5 $s^{-1}$ and a dynamic viscosity ranging from 1 cps to 100 cps at a shear rate of 10,000 $s^{-1}$ at a temperature of 25° C. In another example, the penetrating liquid functional material 30 can have a dynamic viscosity of 5 cps to 1,000 cps at shear rate of 5 $s^{-1}$ and is 2 cps to 15 cps at a shear rate of 10,000 $s^{-1}$ at a temperature of 25° C. At an even higher shear rate range (>50,000 to 500,000 $s^{-1}$ or more) dynamic viscosity of the penetrating liquid functional material 30 can drop further (e.g., from 1 to 10 cps). As such, high shear rates or other mechanical or thermal forces can enable reliable jetting from inkjet printheads 26. The viscosities can be measured using an Anton Paar Rheometer or a CAP2000 Rheometer from Brookfield Instruments, or an m-VROC™ Viscometer from RheoSense, and can be measured by shearing at room temperature (about 25° C.). Notably, the addition of heat with shear can alter, e.g., lower, the viscosity profiles of the penetrating liquid functional material 30.

In an example, the pH of the penetrating liquid functional material 30 can be from 9 to 12. In another example, the pH can be from 9.5 to 11 or from 9.5 to 10.5. In some instances, the pH can give the larger metal oxide nanoparticles (e.g., alumina particles) a negative charge that helps maintain a stable ink with other anionically charged metal or semi-metal species that may be present. Furthermore, the penetrating liquid functional material 30 can be formulated so that the pH may in some cases drop at or below the isoelectric point of the larger metal oxide nanoparticles when printed on the build material 16, and thus, the negative charge becomes neutral or even positive. Due to water evaporation, absorption, and/or concentration enrichment, the pH may actually not need to drop much to trigger a strong attraction interaction due to van der Waals interactions. Thus, in some cases, a drop in pH, even if not at or below the isoelectric point of the larger metal oxide nanoparticles, can still have a positive effect.

In another example, the penetrating liquid functional material 30 of the present disclosure can be very stable over time, and this stability can be attributed in part to the relatively low conductivity levels. As previously mentioned, the penetrating liquid functional material 30 can have a conductivity ranging from about 100 micro Siemens per centimeter (μS/cm) to about 2,000 μS/cm. Lower conductivities within this range can improve stability on the one hand, but higher concentrations of the larger metal oxide nanoparticle may improve the charge balance on the other hand, though higher concentrations may also raise the conductivity level within the penetrating liquid functional material 30. Thus, other more specific ranges of conductivity that can be selected for formulating the penetrating liquid functional materials 30 of the present disclosure can be from about 100 µS/cm to about 1,000 µS/cm or from about 500 µS/cm to about 1,000 µS/cm, for example.

As used herein, "structured network" refers to the three dimensional structure formed by the smaller metal oxide particles in the presence of the larger metal oxide particles via electrostatic interactions and/or physical interactions in the penetrating liquid functional material 30. The three dimensional structure is dependent upon mechanical and/or thermal forces. The mechanical and/or thermal forces, such as shear energy or heat energy, weaken the structured network resulting in the viscosity changes based on the amount of force applied. In one example, the structured network does not include polymers. However, such an example does not preclude polymers from being present within the penetrating liquid functional material 30, or even trapped or contained within the structured network. For example, the present penetrating liquid functional material 30 can further include a polymeric surfactant that does not self-assemble as part of the three dimensional structure but can be present within such a structure Regarding the present description as it relates to "non-Newtonian," a non-Newtonian fluid is one which has viscosity dependent on an applied force, such as shear or thermal forces (added thermal). For example, shear thinning fluids decrease in viscosity with increasing rate of shear. The penetrating liquid functional material 30 of the present application can exhibit these same shear thinning effects, under the fluid ejection conditions in which penetrating liquid functional material 30 is moved between the fluid container and the printhead 26 of an inkjet device. In another example, thermal thinning fluids decrease in viscosity with increasing rate of heat. The penetrating liquid functional material 30 of the present disclosure can likewise show these same thermal thinning effects, when the penetrating liquid functional material 30 is heated during printing, e.g., at the fluid container or at the printhead 26 of an inkjet device.

In another aspect, the energy absorber, e.g. pigments that may be large and dense, in the non-Newtonian liquids show little or no settling in the fluid container or printhead 26 during the times when the penetrating liquid functional material 30 is not moving through the system or when the penetrating liquid functional material 30 is not heated. When little or no dynamic pressure is being applied to the penetrating liquid functional material 30 to move it through the system or when no heat is being applied to the penetrating liquid functional material 30, the penetrating liquid functional material 30 has a viscous consistency. However, when the normal amount of dynamic pressure (at least ~10,000 Pascals) is applied to the penetrating liquid functional material 30 to move it through the inkjet system or when the penetrating liquid functional material 30 is heated to 50° C. or more, the penetrating liquid functional material 30 viscosity can change significantly, e.g. going from 25 cps to 2 cps. Thus, when such penetrating liquid functional material 30 is ejected at a high frequency from inkjet dispensing devices, the dynamic viscosities of the penetrating liquid functional material 30 measured inside the printhead 26 do not interfere with the ejection process of the inkjet system. Generally, during the time when the penetrating liquid functional material 30 is not moving or being heated, pigment or other particulate settling is either completely prevented or slowed down by several orders of magnitude.

The penetrating liquid functional material 30 may include a variety of components that contribute to the properties disclosed herein. In an example, the penetrating liquid functional material 30 includes the first (or small) metal oxide nanoparticle, the second (or larger) metal oxide nanoparticle, an electromagnetic radiation absorber, an organic solvent, a surfactant, and a balance of water. In some instances, the penetrating liquid functional material 30 may include these components and no other components. In other instances, the penetrating liquid functional material 30 may also include a dispersant. Each component will be explained in greater detail below.

The various ranges for the penetrating liquid functional material 30 may be suitable for forming a thermal inkjet printable material 30. Each of the given ranges may be broader when the material 30 is to be formulated for piezoelectric inkjet printing in part because the piezoelectric system can tolerate as much as a 50% increase in solids content with respect to the solids content of the thermal inkjet printable material 28. For example, the stabilizing liquid functional material 28 that is printable via a thermal inkjet printer may have a 10% solids content, and the stabilizing liquid functional material 28 that is printable via a piezoelectric inkjet printer may have a 15% solids content.

The penetrating liquid functional material 30 may include the first metal oxide nanoparticle. The first metal oxide nanoparticle are small, and have a particle size ranging from about 0.5 nm up to 10 nm. As a specific example, the particle size of each small particle ranges from greater than 0 nm to about 2 nm.

The first metal oxide nanoparticle may be present in the penetrating liquid functional material 30 in an amount ranging from about 5% to about 15% by weight based on the total weight of the penetrating liquid functional material 30. In another example, the first metal oxide nanoparticle may be present in an amount ranging from about 5% to about 10% by weight. In yet another example, the first metal oxide nanoparticle may be present in an amount of about 8% to 12% by weight.

The first (small) metal oxide nanoparticles may include a metal or semi-metal atom and at least one oxygen atom. Examples of suitable semi-metals include silicon, boron, germanium, arsenic, antimony, and tellurium. Examples of suitable metals include aluminum, zinc, iron, titanium, indium, zirconium, etc. Some specific examples of the small nanoparticles include substantially spherical or non-spherical silica particles, alumina particles, zinc oxide particles, iron oxide particles (e.g., $Fe_2O_3$), titanium oxide particles (e.g., $TiO_2$), indium oxide particles, zirconium oxide particles (e.g., ZrO), copper oxide particles (e.g., CuO), cobalt oxide particles (e.g., CoO), silver oxide particles ($Ag_2O$), or combinations thereof. In some examples, the alumina particles that may be used as the small metal oxide nanoparticles may have the formula AlO(OH), and may be diaspore (i.e., α-AlO(OH)) or boehmite (i.e., γ-AlO(OH)). In some other examples, the alumina particles that are present in the penetrating liquid functional material 30 may have the formula $Al_2O_3$. Any of the previously listed metal oxide nanoparticles may also be mixed with gold nanoparticles. In some examples of the penetrating liquid functional material 30, the small metal oxide nanoparticles include substantially spherical silica (particle size of about 2 nm to 5 nm).

The penetrating liquid functional material 30 may also include the second metal oxide nanoparticle that has at least one dimension that is greater than 10 nm (and thus is considered to be larger than the first metal oxide nanoparticle). Any of the previous metal oxide materials may be used for the second metal oxide nanoparticles. As examples, the second metal oxide nanoparticles may be formed of silica, alumina, titanium oxide, and combinations thereof. In an example, the second metal oxide nanoparticle may have a particle size ranging from about 5 nm to about 50 nm. As more specific examples, the large metal oxide nanoparticles may be substantially spherical silica particles having a diameter of about 50 nm, or substantially spherical alumina particles having a particle size ranging about 20 nm to about 30 nm. As another example, the large metal oxide nanoparticles may be anisotropic silica. One example of the anisotropic silica is fibrous silica having a diameter ranging from about 5 nm to about 50 nm and a length ranging from about 50 nm to about 250 nm, where the length is larger than the diameter. Another example of the anisotropic silica is chain silica formed of silica nanoparticles aggregated together similar to a string of pearls. The silica nanoparticles in chain silica each has a diameter ranging from about 5 nm to about 50 nm and the chain length ranges from about 50 nm to about 250 nm, where the length is larger than each of the diameters. In some of the examples disclosed herein, the penetrating liquid functional material 30 includes a combination of the second metal oxide nanoparticles, such as large, substantially spherical silica particles with large, substantially spherical alumina particles, or large anisotropic silica particles with large, substantially spherical alumina particles.

The second metal oxide nanoparticle may be present in an amount ranging from about 0.25% to about 10% by weight based on the total weight of the penetrating liquid functional material 30. In another example, the second metal oxide nanoparticle can be present in an amount ranging from about 0.5% to about 4% by weight, and in yet another example, from about 0.75% to about 2% by weight.

The inclusion of the second metal oxide nanoparticle can contribute to the structure of the penetrating liquid functional material 30. The structured network forms with the first metal oxide nanoparticle being in a presence of the second metal oxide nanoparticle co-dispersed in a liquid phase (liquid vehicle which includes the organic solvent and water). The following is an example of the structured network that forms when the first metal oxide particle is silica and the second metal oxide particle is alumina. With the alumina nanoparticle close to the point of zero charge (i.e., the isoelectric point of alumina), a strong attraction between the silica and alumina particles can occur and the van der Waals interactions increase, thereby forming a strong attractive potential resulting in a structured network by providing elastic content to a predominantly fluidic system. In another example when the first and second metal oxide particles are formed of the same material but have a different morphology (which results in a difference/separation in the charge density of the particles), the structured network refers to the three dimensional structure formed by the ceramic particles via loosely connected, physical interactions.

As mentioned, these structured systems show non-Newtonian flow behavior, thus providing useful characteristics for implementation in an inkjet ink because their ability to shear or thermal thin for jetting. Once jetted, this feature allows the jetted drops to become more elastic-, mass-, or gel-like when they strike the build material 16 surface. These characteristics can also provide improved build material 16 attributes, such as the enhanced interlayer bonding and strengthened mechanical properties.

Regarding the penetrating liquid functional material 30 of the present disclosure, the role of second metal oxide nanoparticle can impact both the jettability and the response after jetting. When comparing the penetrating liquid functional material 30 with a non-Newtonian inkjet ink without the second metal oxide nanoparticle but otherwise having an identical formulation, the penetrating liquid functional material 30 will typically have a higher viscosity over a range of shear rates. In one example, the second metal oxide nanoparticle can be added such that its presence in this system is enough to make an appreciable difference in the printing characteristics of the penetrating liquid functional material 30, but not so much that the penetrating liquid functional material 30 becomes too low in viscosity.

The first (small) metal oxide nanoparticles and/or the second (larger) metal oxide nanoparticles may be incorporated into examples of the penetrating liquid functional material 30 as part of respective aqueous nanoparticle dispersions. As examples, a first aqueous nanoparticle dispersion may include water, the small metal oxide nanoparticles, and a dispersant, and a second aqueous nanoparticle dispersion may include water, the larger metal oxide nanoparticles, and a dispersant.

Examples of suitable dispersants include water-soluble anionic species of low and high molecular weight, such as phosphates and polyphosphates, phosphonates and polyphosphonates, phosphinates and polyphosphinates, carboxylates (such as citric acid or oleic acid), and polycarboxylates (such as acrylates and methacrylates). Other examples include hydrolysable alkoxysilanes with an alkoxy group attached to water-soluble (hydrophilic) moieties, such as water-soluble polyether oligomer chains, phosphate groups or carboxylic groups. In some examples, the dispersant used to disperse first and second ceramic nanoparticles can be a polyether alkoxysilane or polyether phosphate dispersant.

Examples of polyether alkoxysilane dispersants used to dispersed first and second metal oxide nanoparticles can be represented by the following general Formula (I):

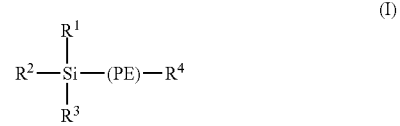

(I)

wherein:

a) $R^1$, $R^2$ and $R^3$ are hydroxy groups, or hydrolyzable linear or branched alkoxy groups. For hydrolyzable alkoxy groups, such groups can have 1 to 3 carbon atoms; in one aspect, such groups can be —$OCH_3$ and —$OCH_2CH_3$. In some examples, $R^1$, $R^2$ and $R^3$ are linear alkoxy groups having from 1 to 5 carbon atoms. In some other examples, $R^1$, $R^2$ and $R^3$ groups are —$OCH_3$ or —$OC_2H_5$.

b) PE is a polyether oligomer chain segment of the structural formula $[(CH_2)_n—CH(R)—O]_m$, attached to Si through Si—C bond, wherein n is an integer ranging from 0 to 3, wherein m is an integer superior or equal to 2 and wherein R is H or a chain alkyl group. R can also be a chain alkyl group having 1 to 3 carbon atoms, such as $CH_3$ or $C_2H_5$. In some examples, m is an integer ranging from 3 to 30 and, in some other examples, m is an integer ranging from 5 to 15. The polyether chain segment (PE) may include repeating units of polyethylene glycol (PEG) chain segment (—$CH_2CH_2$—O—), or polypropylene glycol (PPG) chain segment (—$CH_2$—$CH(CH_3)$—O—), or a mixture of both types. In some examples, the polyether chain segment (PE) contains PEG units (—$CH_2CH_2$—O—).

c) $R^4$ is hydrogen, or a linear or a branched alkyl group. In some examples, $R^4$ is an alkyl group having from 1 to 5 carbon atoms.

Other examples of dispersants used to disperse the first and second metal oxide nanoparticles can include polyether alkoxysilane dispersants having the following general Formula (II):

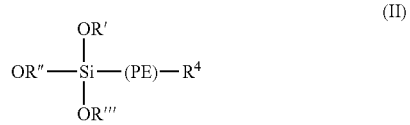

wherein R', R" and R'" are linear or branched alkyl groups. In some examples, R', R" and R'" are linear alkyl groups having from 1 to 3 carbon atoms in chain length. In some examples, R', R" and R'"—$CH_3$ or —$C_2H_5$. $R^4$ and PE are as described above for Formula (I); i.e. PE is a polyether oligomer chain segment of the structural formula: $[(CH_2)_n$—CH—R—O$]_m$, wherein n is an integer ranging from 0 to 3, wherein m is an integer superior or equal to 2 and wherein R is H or a chain alkyl group; and $R^4$ is hydrogen, or a linear or a branched alkyl group. In some examples, $R^4$ is $CH_3$ or $C_2H_5$.

In some examples, the first and/or second metal oxide nanoparticles present in the penetrating liquid functional material 30 are dispersed with polyether alkoxysilanes. Examples of suitable polyether alkoxysilanes include $(CH_3O)_3Si$—$(CH_2CH_2O)_n'H$; $(CH_3CH_2O)_3Si$—$(CH_2CH_2O)_n'H$; $(CH_3O)_3Si$—$(CH_2CH_2O)_n'CH_3$; $(CH_3CH_2O)_3Si$—$(CH_2CH_2O)_n'CH_3$; $(CH_3O)_3Si$—$(CH_2CH_2O)_n'CH_2CH_3$; $(CH_3CH_2O)_3Si$—$(CH_2CH_2O)_n'CH_2CH_3$; $(CH_3O)_3Si$—$(CH_2CH(CH_3)O)_n'$ H; $(CH_3CH_2O)_3Si$—$(CH_2CH(CH_3)O)_n'$ H; $(CH_3O)_3Si$—$(CH_2CH(CH_3)O)_n'CH_3$; $(CH_3CH_2O)_3Si$—$(CH_2CH(CH_3)O)_n'CH_3$; wherein n' is an integer equal to 2 or greater. In some examples, n' is an integer ranging from 2 to 30 and, in some other examples, n' is an integer ranging from 5 to 15.

Commercially available examples of the polyether alkoxysilane dispersants include SILQUEST® A-1230 manufactured by Momentive Performance Materials and DYNASYLAN® 4144 manufactured by Evonik/Degussa.

The amount of dispersant used in the first and/or second metal oxide nanoparticle dispersion may vary from about 1% by weight to about 300% by weight of the first and/or second metal oxide nanoparticle content. In some examples, the dispersant content range is between about 2% to about 150% by weight of the first and/or second metal oxide nanoparticle content. In some other examples, the dispersant content range is between about 5% to about 100% by weight of the first and/or second metal oxide nanoparticle content.

The dispersion of first and/or second metal oxide nanoparticles can be prepared via milling or dispersing first and/or second metal oxide nanoparticle powder in water in the presence of suitable dispersants. In an example, the first and/or second metal oxide nanoparticle dispersion may be prepared by milling commercially available inorganic oxide pigment having large particle size (in the micron range) in the presence of the dispersants described above until the desired particle size is achieved. The starting dispersion to be milled can be an aqueous dispersion with solid content up to 40% by weight of the first and/or second metal oxide nanoparticles. The milling equipment may be a bead mill, which is a wet grinding machine capable of using very fine beads having diameters of less than 1.0 mm (and, generally, less than 0.3 mm) as the grinding medium, for example, Ultra-Apex Bead Mills from Kotobuki Industries Co. Ltd.

The milling duration, rotor speed, and/or temperature may be adjusted to achieve the dispersion particle size desired.

Some examples of commercially available dispersions or powders suitable for use as the small nanoparticles include SNOWTEX® ST-S (2 nm colloidal silica dispersion, Nissan Chemical) or DISPERAL® P2 (3 nm to 10 nm boehmite powder, Sasol North America). The alumina powder is dispersible in water, and shearing may be used to suitably disperse the powder in water. Some examples of commercially available dispersions suitable for use as the large nanoparticle dispersion include ST-30-LH (50 nm colloidal silica dispersion, Nissan Chemical) or SNOWTEX® ST-UP (anisotropic, fiber-like silica dispersion with dimensions of 10 nm to 15 nm by 100 nm to 140 nm, Nissan Chemical) or gamma $Al_2O_3$ (20 nm to 30 nm alumina dispersion, US Research Nanomaterials, Inc.). It is to be understood that the particle size may vary depending upon the equipment and technique used to make the dispersion. In an example, the particle size is measured with a dynamic light scattering (DLS) tool from Nanotrac Co.

In accordance with some examples of the present disclosure, first metal oxide nanoparticle and second metal oxide nanoparticle co-dispersions as described herein can be useful in that the second metal oxide nanoparticle (e.g., alumina) has a charge density that is sensitive to the pH of the penetrating liquid functional material 30. When the pH of the penetrating liquid functional material 30 is close to the isoelectric point or point of zero charge of the second ceramic nanoparticle, the amount of charge on the second ceramic nanoparticles is likewise at or near zero. As a result, a desirable balance of charge density and holding this zero charge effect to a minimum can be achieved by utilizing the first nanoparticle dispersion and the relatively low charge density second ceramic nanoparticle dispersion together in the penetrating liquid functional material 30. The combination of the first and second metal oxide nanoparticles results in improved (lower) aqueous phase separation. However, the second metal oxide nanoparticle also is included in the penetrating liquid functional material 30 at a concentration so that it is of a sufficient strength to affect a positive influence on the networking ability of the penetrating liquid functional material 30 of the present disclosure.

The penetrating liquid functional material 30 also includes an organic solvent. The organic solvent may be present in an amount ranging from about 5% to about 50% by weight based on the total weight of the penetrating liquid functional material 30. In another example, the organic solvent can be present in an amount ranging from 20% to 40% by weight. As used herein, "organic solvent" refers to any organic solvent or mixture thereof. As such, the term organic solvent includes systems of solvents. The present organic solvents are in addition to any water present in the penetrating liquid functional material 30. Typical organic solvents that can be used include methanol, ethanol, propanol, iso-propanol, a glycol ether having at least about four carbon atoms, C4-C8 alcohols, 1-methoxy-2-propanol, 2-methoxy ethanol, 2-ethoxy ethanol, 1-methoxy-2-acetoxy propane, ethyl lactate, a glycol ether (in some instances having at least about 10 carbon atoms), a dihydric alcohol (in some instances having at least about 2 carbon atoms), tripropylene glycol monomethyl ether, tripropylene glycol-n-butyl ether, propylene glycol phenyl ether, 2-pyrrolidinone (2P), 1-(2-hydroxyethyl)-2-pyrrolidinone (2HE2P), glycerol polyoxyethyl ether (LEG-1), 1,3-bis(2-hydroxyethyl)-5,5-dimethylhydantoin (DANTOCOL® DHE), 2-methyl-1,3-propanediol (MPdiol), ethylhydroxy-propanediol (EHPD), glycerol, 1,5-pentanediol, 1,2-pentanediol, thiodiglycol, sulfolane, 1,3-dimethyl-2-imidazolidinone, caprolactam, ethylene glycol, diethylene glycol, triethylene glycol, tetraethylene glycol, propylene glycol, dipropylene glycol, tripropylene glycol, trimethylene glycol, butylene glycol, hexylene glycol, polyethylene glycol, polypropylene glycol, glycerol, 1,2,6-hexanetriol, ethylene glycol monomethyl ether, ethylene glycol monoethyl ether, diethylene glycol monomethyl ether, diethylene glycol monoethyl ether, diethylene glycol dimethyl ether, and mixtures thereof.

Additionally, organic solvents can be classified as network participating solvents and network non-participating solvents. As used herein, "network participating solvent" refers to organic solvents that increase viscosity of the penetrating liquid functional material 30, measured at any functional shear rate. As used herein, "network non-participating solvent" refers to organic solvents that decrease the viscosity of the penetrating liquid functional material 30, measured at any functional shear rate. As such, the penetrating liquid functional material 30 can be altered based on the types of organic solvents used. For example, when the penetrating liquid functional material 30 includes a network participating solvent, the structured network can be strengthened, e.g., the viscosity of the penetrating liquid functional material 30 can be increased. However, when a network non-participating solvent is used, the structured network can be weakened, e.g., the viscosity of the penetrating liquid functional material 30 can be decreased. In one example, network participating solvents can include ethylhydroxypropanediol (EHPD), glycerol, 1,5-pentanediol, ethylene glycol, triethylene glycol, and mixtures thereof. In another example, network non-participating solvents can include 2-pyrrolidinone, 1,2-pentanediol, MPdiol, 1,2-hexanediol, sorbitol, 1-(2-hydroxyethyl)-2-pyrrolidinone, sulfolane, and mixtures thereof. As such, the structured network properties and resultant penetrating liquid functional material 30 properties can be modified by mixing and matching particular organic solvents. In one example, the organic solvent includes a mixture of a network participating solvent and a network non-participating solvent. Additionally, the penetrating liquid functional material 30 can contain a significant amount of organic solvent, including network participating solvents and/or network non-participating solvents.

The penetrating liquid functional material 30 also includes an electromagnetic radiation absorber. In one example, the electromagnetic radiation absorber can be present in the penetrating liquid functional material 30 in an amount ranging from about 1% to about 10% by weight based on the total weight of the penetrating liquid functional material 30. In another example, the amount of the electromagnetic radiation absorber may range from about 1% to about 7% by weight. In yet another example, the electromagnetic radiation absorber may be present in an amount of about 4.4% by weight. The electromagnetic radiation absorber may be selected to absorb any wavelength in the electromagnetic spectrum. As examples, the electromagnetic radiation absorber may be capable of absorbing IR radiation (i.e., a wavelength of about 700 nm to about 1 mm, including near-IR radiation (i.e., a wavelength of about 750 nm to about 1.4 µm)), ultraviolet radiation (i.e., a wavelength of about 10 nm to about 380 nm), visible radiation (i.e., a wavelength from about 390 nm to about 700 nm), microwave radiation (i.e., a wavelength of about 1 mm to about 1 m), radio radiation (i.e., a wavelength from about 1 m to about 1000 m), or a combination thereof. An example of the electromagnetic radiation absorber may be a susceptor, such as carbon black, graphite, magnetite, and/or various iron oxides. Carbon black may also be used as an IR (including near-IR) radiation absorber. Examples of other suitable radiation absorbers include visible dyes or IR dyes of any suitable color.

Additionally, the penetrating liquid functional material 30 may include non-ionic, cationic, and/or anionic surfactants, ranging from 0.01% by weight to 5% by weight. In an example, the surfactant may range from about 0.1% to about 2% by weight based on the total weight of the penetrating liquid functional material 30. Some specific examples of the surfactant include an ethoxylated acetylenic diol, such as SURFYNOL® 465 (commercially available from Air Products), a non-ionic surfactant commercially available under the tradename PLURONIC® P123 (BASF Corp., a difunctional block copolymer surfactant terminating in primary hydroxyl groups), a nonionic fluorosurfactant (e.g., CAPSTONE® fluorosurfactants from DuPont, previously known as ZONYL FSO), an ethoxylated low-foam wetting agent (e.g., SURFYNOL® 440 or SURFYNOL® CT-111 from Air Products and Chemical Inc.), an ethoxylated wetting agent and molecular defoamer (e.g., SURFYNOL® 420 from Air Products and Chemical Inc.), non-ionic wetting agents and molecular defoamers (e.g., SURFYNOL® 104E from Air Products and Chemical Inc.), or water-soluble, non-ionic surfactants (e.g., TERGITOL™ TMN-6 from The Dow Chemical Company).

The penetrating liquid functional material 30 also includes a balance of water. As such, the amount of water will depend upon the amounts of the other material 30 components. It is noted that in one specific example, the penetrating liquid functional material 30 can be an aqueous inkjet ink, having a water content ranging from about 30% to about 95% by weight (e.g., the balance of water).

The present penetrating liquid functional material 30 formulations can include other components, such as biocides, viscosity modifiers, materials for pH adjustment, sequestering agents, preservatives, and the like. While some other components may be utilized, examples of the penetrating liquid functional material 30 exclude a binder (so that the build material 16 does not bond immediately upon application of the penetrating liquid functional material 30).

The properties of the penetrating liquid functional material 30, e.g., viscosity, ink efficiency, etc., can be affected by a number of variables including the type of the first metal oxide nanoparticle used, the type of second metal oxide nanoparticle (e.g., spherical, colloidally synthesized or grown, chain, etc.), the type of solvents, the amounts of these components, pH, ionic strength, etc.

In an example of a manufacturing method, the nanoparticle dispersion(s) can be prepared and then added to the other components (e.g., organic solvent, surfactant, radiation absorber, water) to form the penetrating liquid functional material 30. In another example, the method of manufacturing the penetrating liquid functional material 30 can include dispersing the second metal oxide nanoparticles in an aqueous liquid vehicle; dispersing the first metal oxide nanoparticles in the aqueous liquid vehicle; and adding the organic solvent, the surfactant, and the electromagnetic radiation absorber to the aqueous liquid vehicle.

Regarding the method of manufacturing the penetrating liquid functional material 30, it is to be understood that the steps can be performed in a number of sequences and are not intended to be limited to require any particular sequence. For example, the adding of the organic solvent can be before mixing of the first metal oxide nanoparticles, and vice versa. Additionally, it is noted that any and all combinations of such steps or individual step may be performed sequentially or simultaneously. For example, the mixing of the first ceramic nanoparticles and the adding of the organic solvent may be performed sequentially or may be performed simultaneously.

The penetrating liquid functional material 30 may be used in conjunction with multiple imaging systems, examples of which include thermal or piezo inkjet, electrostatic, liquid electrophotographic printing (LEP), etc. In an example, the penetrating liquid functional material 30 is loaded in the inkjet print cartridge 26. The inkjet print cartridge 26 can be adapted for shearing the penetrating liquid functional material 30 within the printhead 26 at a shear rate of 10,000 $s^{-1}$ or more (e.g., 500,000 $s^{-1}$ or more in the firing chamber) to provide a dynamic viscosity ranging from 2 cps to 100 cps.

After the penetrating liquid functional material 30 has been applied to portion(s) 44 of the first layer 10 of the build material 16, the first layer 10 may be exposed to electromagnetic radiation R. This is shown at reference numeral 106 and FIG. 2C.

The electromagnetic radiation R is emitted from an electromagnetic radiation source 31, such as, for examples, a microwave, a UV or IR curing lamp, or IR light emitting diodes (LED), halogen lamps emitting in the visible and near-IR range, or lasers with suitable electromagnetic wavelengths. The electromagnetic radiation source 31 used will depend, at least in part, on the type of electromagnetic radiation absorber used in the penetrating liquid functional material 30.

Figure 2C:
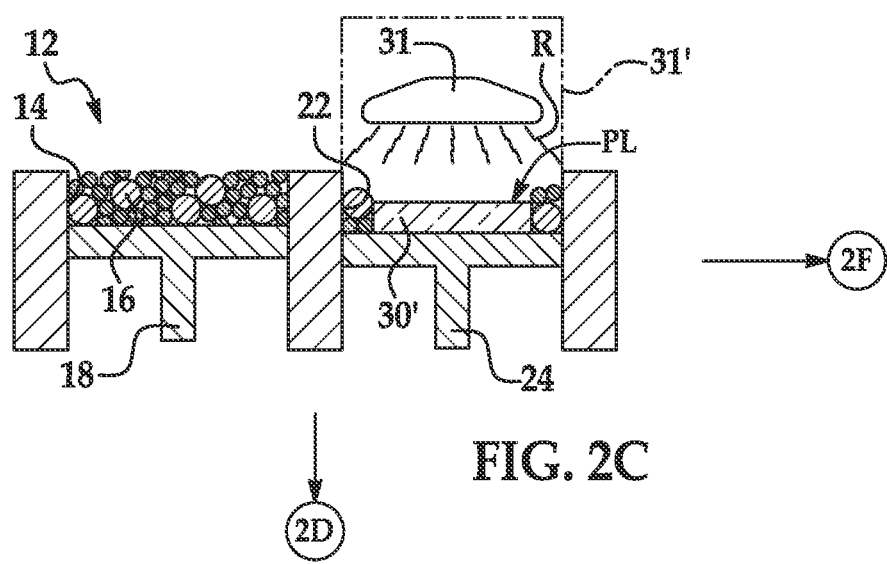

In the example shown in phantom in FIG. 2C, the electromagnetic radiation source 31' is a microwave. In this example, the first build material layer 10, having the penetrating liquid functional material 30 thereon, is removed from the fabrication bed 22 and is placed into the electromagnetic radiation source 31' (i.e., microwave), where electromagnetic radiation R exposure takes place.

In the other example depicted in FIG. 2C, the electromagnetic radiation source 31 may be attached, for example, to a carriage (not shown) that also holds the printhead 26. The carriage may move the electromagnetic radiation source 31 into a position that is adjacent to the fabrication bed 22.

The electromagnetic radiation source 31, 31' may be programmed to receive commands from the central processing unit and to expose the first layer 10 including the penetrating liquid functional material 30 to electromagnetic radiation R. The length of time the electromagnetic radiation R is applied for, or energy exposure time, may be dependent, for example, on one or more of: characteristics of the electromagnetic radiation source 31, 31'; characteristics of the build material 16; and/or characteristics of the penetrating liquid functional material 30.

The penetrating liquid functional material 30 enhances the absorption of the electromagnetic radiation R, converts the absorbed radiation to thermal energy, and promotes the transfer of the thermal heat to the build material 16 in contact therewith (i.e., in the portion(s) 44). In an example, the penetrating liquid functional material 30 sufficiently elevates the temperature of the build material 16 in the portions 44 above the melting point(s), allowing curing (e.g., sintering, binding, fusing, etc.) of the build material 16 particles to take place. The electromagnetic radiation R causes the first layer 10 of the build material 16 including the penetrating liquid functional material 30 to at least partially fuse.

In the example shown in FIG. 2C, the cured portions of the build material having had the penetrating liquid functional material 30 thereon are shown as 30'. The part layer PL is formed of cured portion(s) 30'.

After electromagnetic radiation R exposure, the uncured build material 16 may be removed and the part layer PL (including cured build material portion 30') is formed.

Several other 3D printing methods are disclosed herein which are variations of the method 100 shown in FIG. 1. One example method is depicted in FIGS. 2A, 2B, 2D, and 2E. Another example method is shown in FIGS. 2A-2C, 2F, and 2G. Yet another example method is shown in FIGS. 2A, 2B, 2H, and 2I.

The method depicted in FIGS. 2A, 2B, 2D, and 2E will now be described. This example method includes applying the first layer 10 of the build material 16 and patterning the part layer by selectively applying the penetrating liquid functional material 30 on at least a portion(s) 44 of the first layer 10. The build material 16 application and the selective application of the penetrating liquid functional material 30 are respectively described herein in reference to reference numeral 102 of FIG. 1 (and FIG. 2A) and reference numeral 104 of FIG. 1 (and FIG. 2B), and thus will not be reiterated.

Figure 2D:
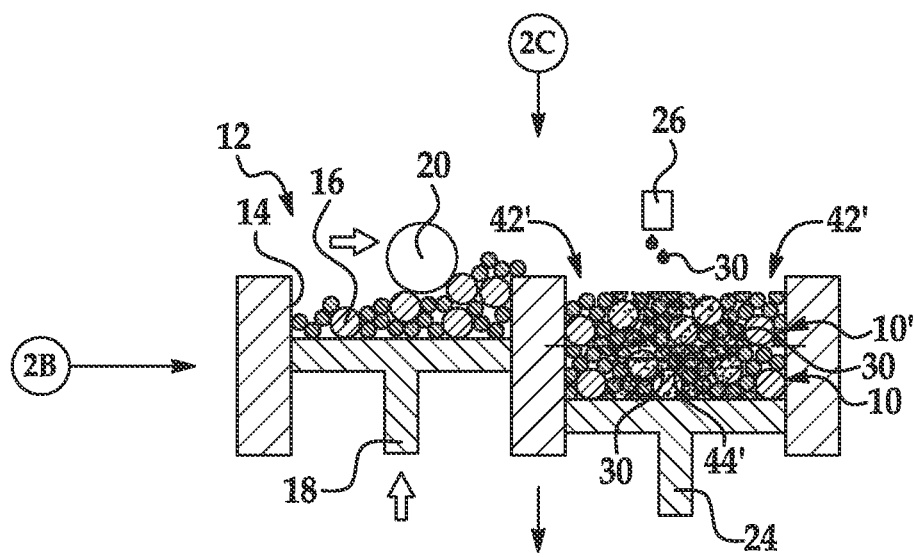

After the patterning of the part layer (FIG. 2B), this example of the method includes applying an additional layer 10' of the build material 16. One example of this is shown in FIG. 2D. In this example, the additional layer 10' is applied to the first build material layer 10 patterned with the penetrating liquid functional material 30. It is to be understood that the same type, size, and amount of build material 16 as previously described herein may be used to form the additional layer 10' of build material 16.

Still referring to FIG. 2D, in this example of the method, an additional part layer is patterned by selectively applying the penetrating liquid functional material 30 on at least a portion 44' of the additional layer 10'. The penetrating liquid functional material 30 may be applied in a similar manner as previously described, using printhead 26. It to be understood that the entire additional part layer may be patterned with the penetrating liquid functional material 30 (i.e., no other functional material is utilized along with the penetrating liquid functional material 30). In the example shown in FIG. 2D, the penetrating liquid functional material 30 is applied to the additional layer 10' of the build material 16 in a pattern that is similar to the pattern of the penetrating liquid functional material 30 applied to the first build material layer 10. As such, in the example shown in FIG. 2D, the penetrating liquid functional material 30 is applied to the portion 44' and not to the portions 42'.

Figure 2E:
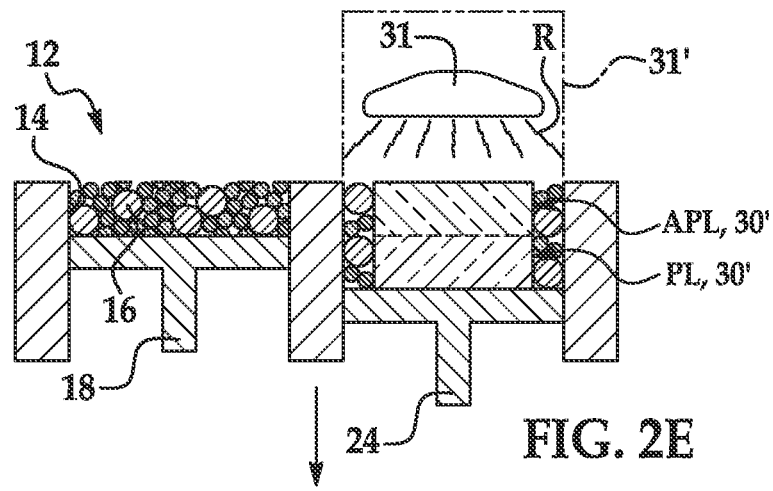

After applying the penetrating liquid functional material 30 to pattern the additional part layer in the additional build material layer 10', the first and additional layers 10, 10' may be simultaneously exposed to electromagnetic radiation R. Radiation exposure may be accomplished in a manner as previously described herein for reference numeral 106 and FIG. 2C (e.g., using source 31 or 31'). The radiation R exposure of the two layers 10, 10' together is shown in FIG. 2E. In the example shown in FIG. 2E, the exposure of the first and additional layers 10, 10' to electromagnetic radiation R causes at least partial fusing of the build material 16 in each of the layers 10, 10' having the penetrating liquid functional material 30 thereon. This example results in the formation of the additional part layer APL on the part layer PL. In this example, the part layer PL and the additional part layer APL are made up of the cured portion(s) 30' of the build material having had the penetrating liquid functional material 30 thereon.

Prior to performing the electromagnetic radiation R exposure, it is to be understood that FIG. 2D may be repeated as many times as desirable to pattern additional part layers (e.g., up to "n" layers until the part shape is obtained, where n is any number). After a desirable number of layers are patterned in the shape of the 3D object, the electromagnetic radiation R exposure may be performed to simultaneously cure/fuse all of the layers 10, 10' and form the 3D object.

As noted above, another example of the method is shown in FIGS. 2A-2C, 2F and 2G. The build material 16 application and the selective application of the penetrating liquid functional material 30 of this example method are respectively described herein in reference to reference numeral 102 of FIG. 1 (and FIG. 2A) and reference numeral 104 of FIG. 1 (and FIG. 2B), and thus are not reiterated. Additionally, the exposure of the first layer 10 to electromagnetic radiation R to form the part layer PL (FIG. 2C) has also been described herein, and thus is not reiterated.

Figure 2F:
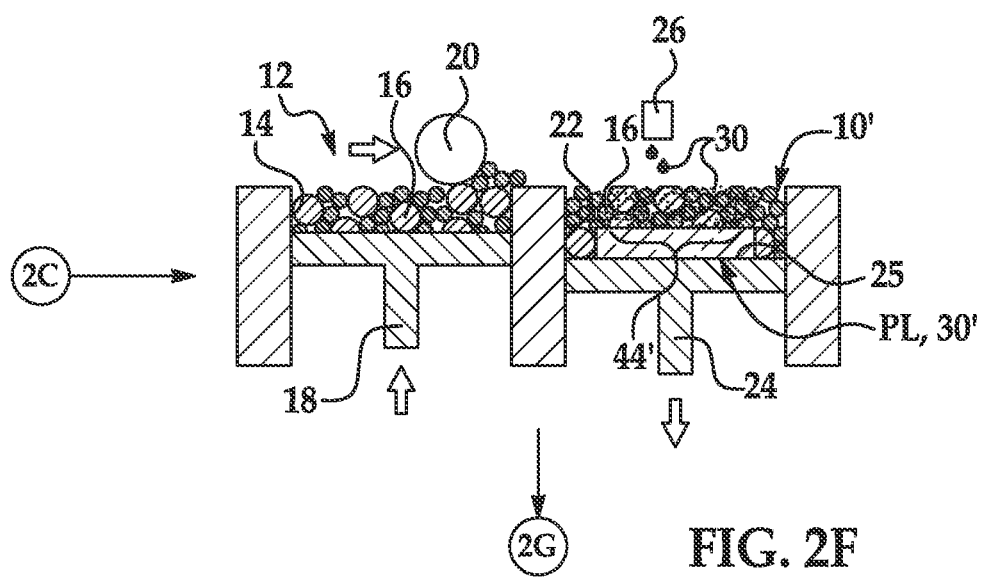

In this example, after exposing the first layer 10 having the penetrating liquid functional material 30 thereon to electromagnetic radiation (FIG. 2C), the method includes applying an additional layer 10' of the build material 16. One example of this is shown in FIG. 2F. In this example, the additional layer 10' is applied to the part layer PL (formed of cured portion 30'). It is to be understood that the same type, size, and amount of build material 16 as previously described herein may be used to form the additional layer 10' of build material 16.

Still referring to FIG. 2F, in this example of the method, an additional part layer is patterned by selectively applying the penetrating liquid functional material 30 on at least a portion 44' of the additional build material layer 10'. The penetrating liquid functional material 30 may be applied in a similar manner as previously described, using printhead 26. In the example shown in FIG. 2F, the penetrating liquid functional material 30 is applied to the additional layer 10' of the build material 16 in a pattern (e.g., on portion 44') that is similar to the pattern of the penetrating liquid functional material 30 applied to the first build material layer 10. It is to be understood that the penetrating liquid functional material 30 may be selectively deposited in any other pattern as well.

Figure 2G:
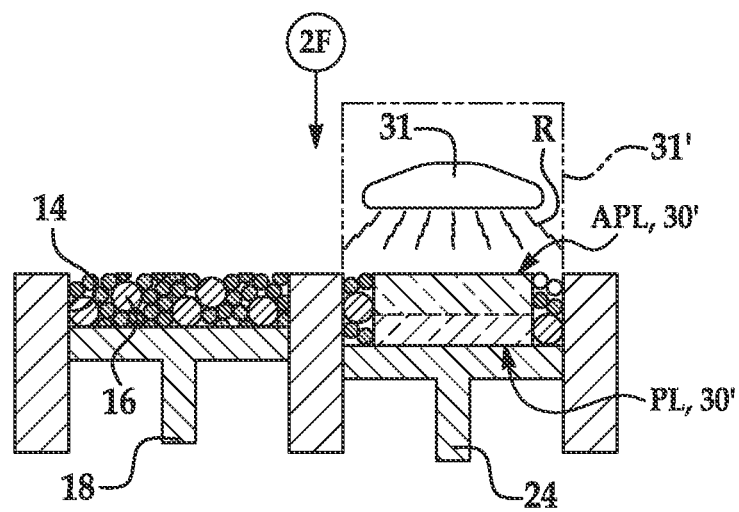

After applying the penetrating liquid functional material 30 to pattern the additional part layer that is to be formed, the additional layer 10' may be exposed to electromagnetic radiation R, as previously described herein. This radiation R exposure is shown in FIG. 2G. In the example shown in FIG. 2G, the exposure of the additional layer 10' to electromagnetic radiation R causes at least partial fusing of the build material 16 in the additional layer 10' having the penetrating liquid functional material 30 thereon. This example results in the formation of the additional part layer APL on the previously solidified part layer PL. In one example, the additional part layer APL is made up of the cured portion(s) 30' of the build material having had the penetrating liquid functional material 30 thereon.

It is to be understood that heat absorbed by the build material 16 during the application of energy in FIG. 2G may propagate to a previously solidified layer, such as the part layer PL, causing at least some of that layer PL to heat up above its melting point. This effect helps create strong interlayer bonding between adjacent layers PL, APL of the 3D object that is formed. This effect may be further enhanced when the penetrating liquid functional material 30 is utilized, in part because the penetrating liquid functional material penetrates through the additional layer 10' and can be in contact with a surface of the part layer PL.

In this example of the method, FIGS. 2F and 2G may be repeated as many times as desirable to create additional part layers APL (e.g., up to "n" layers until the part shape is obtained, where n is any number). In this example of the method, curing takes place after build material 16 application and patterning, and prior to the application of yet another build material layer. It is to be understood that in this example, the penetrating liquid functional material 30 may be utilized to pattern at least part of each additional part layer.

As noted above, yet another example of the method is shown in FIGS. 2A, 2B, 2H and 2I. The build material 16 application and the selective application of the penetrating liquid functional material 30 of the method are respectively described herein in reference numeral 102 of FIG. 1 (and FIG. 2A) and reference numeral 104 of FIG. 1 (and FIG. 2B), and thus are not reiterated.

Figure 2H:
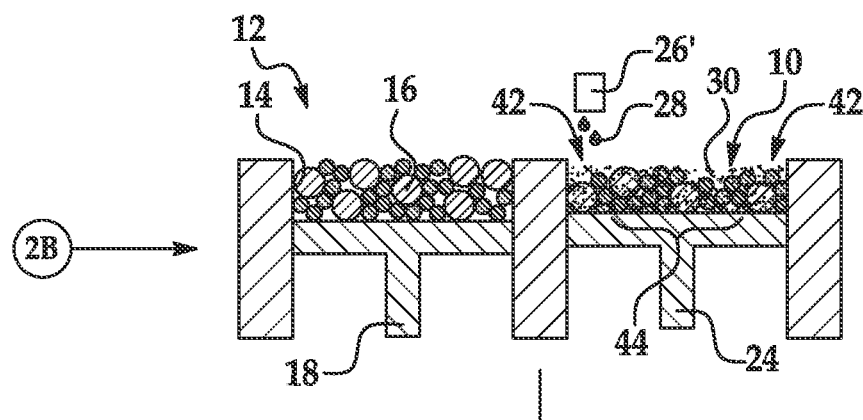

In this example of the method, prior to, simultaneous with, or after the patterning of the part layer with the penetrating liquid functional material 30 (FIG. 2B), another liquid functional material 28 is selectively applied on portion(s) 42 of the build material 16 in the first layer 10 to pattern the perimeter of the part layer PL that is to be formed. This is shown in FIG. 2H. In this example, the penetrating liquid functional material 30 may be selectively applied according to the pattern of the cross-section (which is parallel to the contact surface 25) for the interior portion of the part layer of the 3D object, and the other liquid functional material 28 may be selectively applied along at least part of the perimeter of that cross-section. In the example shown in FIG. 2H, the shape of the part layer to be formed is a rectangular prism, and the pattern of the cross-section that is parallel to the contact surface 25 is a square or rectangle having the perimeter defined by the other liquid functional material 28.

In this example, the other liquid functional material 28 is utilized to stabilize the perimeter of the 3D object to be formed. The penetrating liquid functional material 30, as previously mentioned herein, is utilized to achieve enhanced interlayer bonding and strengthen the mechanical properties of the 3D object to be formed. FIG. 2H depicts one example of when multiple liquid functional materials 28, 30 are utilized, and it is to be understood that the application of the other liquid functional material 28 will depend upon the configuration of the 3D object to be formed.

In an example, the other liquid functional material 28 may be a stabilizing liquid functional material 28. As noted above, the stabilizing liquid functional material 28 may be added to stabilize the perimeter of the 3D object to be formed. As such, it may be desirable to pattern the perimeter with the material 28, and then pattern the remainder of the part layer with the penetrating liquid functional material 30. The build material 16 stabilizes because the stabilizing liquid functional material 28 reduces, and in some instances prevents, the migration of liquids (and solid components contained therein) throughout the build material 16 having the stabilizing liquid functional material 28 thereon. The stabilizing liquid functional material 28 impedes the ability of fluid, and particles in the fluid, to move significantly into the portion(s) of the build material layer that has the stabilizing liquid functional material 28 applied thereto. As such, the stabilizing liquid functional material 28 keeps active solid ingredients from moving through build material 16 that is treated with the stabilizing liquid functional material. Additionally, some liquids, such as water, may be able to move through the portion(s) treated with the stabilizing liquid functional material 28, but at a slower rate than when the stabilizing liquid functional material 28 is not present.

In an example, when the stabilizing liquid functional material 28 is used as the other liquid functional material 28, the stabilizing liquid functional material 28 may include at least some of the same components previously described herein for the penetrating liquid functional material 30. In addition, the stabilizing liquid functional material 28 may have the same pH range, conductivity range, and viscosity range at the previously disclosed sheer rates and temperature as the penetrating liquid functional material 30. In some instances, the stabilizing liquid functional material 28 may not include the surfactant or may include a lesser amount of the surfactant. The amounts of the components and the particle size of some of the components in the stabilizing liquid functional material 28 are described in greater detail below.

The stabilizing liquid functional material 28 includes first and second ceramic nanoparticles that are different from one another. By different, it is meant that the first and second ceramic particles may have different compositions, or that the first and second ceramic particles have the same composition and different morphologies. Any of the second ceramic materials (described below) may be used for the first ceramic nanoparticles, as long as the selected nanoparticles are different in composition and/or morphology.

The stabilizing liquid functional material 28 may include the first ceramic nanoparticle present in an amount ranging from about 0.1% to about 10% by weight based on the total weight of the stabilizing liquid functional material 28. In an example, the first ceramic nanoparticle may be present in an amount of about 1% to 5% by weight. In another example, the first ceramic nanoparticle may be present in an amount ranging from about 0.5% to about 2% by weight.

Some examples of the first ceramic nanoparticle of the stabilizing liquid functional material 28 include discrete, substantially spherical or non-spherical silica particles, fumed silica, fibrous silica, or chain silica. When discrete (i.e., non-aggregated, individual) silica particles are utilized, the primary particle size of each particle ranges from about 10 nm to about 50 nm. In an example, the primary particle size may be about 30 nm. When fibrous silica is utilized, the fibrous silica may have a diameter ranging from about 5 nm to about 50 nm and a length ranging from about 50 nm to about 250 nm. When chain silica is utilized, each particle of the chain may have a diameter ranging from about 5 nm to about 50 nm and the length of the entire chain may range from about 50 nm to about 250 nm.

The stabilizing liquid functional material 28 may include the second ceramic nanoparticle in an amount ranging from about 0.25% to about 5% by weight based on the total weight of the stabilizing liquid functional material 28. In another example, the second metal oxide nanoparticle can be present in an amount ranging from about 0.5% to about 4% by weight, and in yet another example, from about 0.75% to about 2% by weight.

Some examples of the second ceramic nanoparticle include substantially spherical or non-spherical silica particles, alumina particles, zinc oxide particles, iron oxide particles (e.g., $Fe_2O_3$), titanium oxide particles (e.g., $TiO_2$), indium oxide particles, zirconium oxide particles (e.g., $ZrO$), copper oxide particles (e.g., $CuO$), cobalt oxide particles (e.g., $CoO$), silver oxide particles ($Ag_2O$), or combinations thereof. In some examples, the alumina particles that are present in the stabilizing liquid functional material 28 may have the formula $AlO(OH)$, and may be diaspore (i.e., $\alpha$-$AlO(OH)$) or boehmite (i.e., $\gamma$-$AlO(OH)$). In some other examples, the alumina particles that are present in the stabilizing liquid functional material 28 may have the formula $Al_2O_3$. The second ceramic nanoparticle may have a particle size ranging from about 5 nm to about 50 nm in diameter. In an example, the second ceramic nanoparticle has a particle size from about 20 nm to about 30 nm.

Additionally, the same type and amounts of electromagnetic radiation absorber and organic solvents as described herein for the penetrating liquid functional material 30 may be used for the stabilizing liquid functional material 28. Furthermore, the stabilizing liquid functional material 28 may be prepared in the same manner as previously described for the penetrating liquid functional material 30.

While an example of the stabilizing liquid functional material 28 is disclosed herein, it is to be understood that any other liquid functional material 28 may be utilized with the penetrating liquid functional material 30 when it (i.e., 30) is utilized to form the interior of a layer alone.

Still referring to FIG. 2H, in an example, the stabilizing liquid functional material 28 may be applied at the same time that the penetrating liquid functional material 30 is dispensed, using a single pass or using multiple passes. In another example, the stabilizing liquid functional material 28 may be applied before the penetrating liquid functional material 30 is dispensed, in order to define and stabilize the perimeter.

As depicted in FIG. 2H, the stabilizing liquid functional material 28 may be dispensed from an inkjet printhead 26'. While a single printhead 26' is shown in FIG. 2H, it is to be understood that multiple printheads may be used that span the width of the fabrication bed 22. The printhead 26' may be attached to a moving XY stage or a translational carriage (neither of which is shown) that moves the printhead 26' adjacent to the fabrication bed 22 in order to deposit the stabilizing liquid functional material 28. The printhead 26' may be programmed to receive commands from the central processing unit and to deposit the stabilizing liquid functional material 28 in the desired portion(s) 42.

In the example shown in FIG. 2H, the stabilizing liquid functional material 28 may be applied to the portion(s) 42 of the first layer 10 to define, enhance, refine, smooth, etc. the edge(s) of the part layer of the 3D object that is being formed.

Figure 2I:
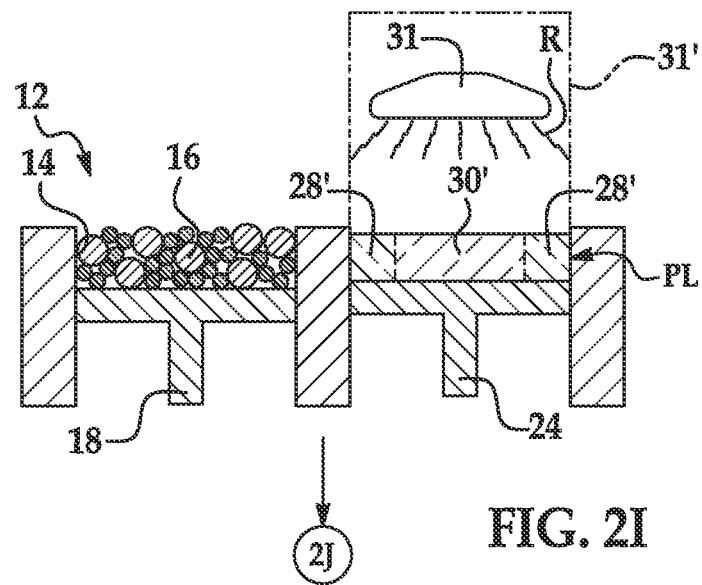

After both the stabilizing liquid functional material 28 and the penetrating liquid functional material 30 have been applied to the first layer 10, the first layer 10 of the build material 16 may be exposed to electromagnetic radiation R as previously described herein. This radiation R exposure is shown in FIG. 2I. In this example, the exposure of the first layer 10 to electromagnetic radiation R causes at least partial fusing of the respective portions 44, 42 of the build material 16 in the first layer 10 having the penetrating liquid functional material 30 and the other functional material 28 thereon. This example results in the formation of the part layer PL. In this example, the part layer PL is made up of the cured portion(s) 30' of the build material having had the penetrating liquid functional material 30 and the cured portion(s) 28' of the build material having had the other functional material 28 thereon.

After electromagnetic radiation R exposure, any uncured build material 16 may be removed and the 3D object (including cured build material portions 28', 30') is formed.

Prior to performing the electromagnetic radiation R exposure as shown in FIG. 2I, it is to be understood that FIGS. 2A, 2B and 2H may be repeated as many times as desirable to pattern additional part layers (e.g., up to "n" layers until the part shape is obtained, where n is any number) having the perimeter defined by the other liquid functional material 28. In this example of the method, it is to be understood that the penetrating liquid functional material 30 may also be applied to a portion of each additional build material layer in order to pattern at least part of each additional part layer. As an example, the other liquid functional material 28 may be used to stabilize the perimeter of each additional part layer that is created, while the penetrating liquid functional material 30 may be used to enhance interlayer bonding and 3D object strength. After a desirable number of layers 10 are patterned in the shape of the 3D object, the electromagnetic radiation R exposure may be performed to simultaneously cure/fuse all of the layers 10 and form the 3D object.

Another example of a method for forming a 3D object is depicted in FIGS. 3A through 3E where an initial part layer is formed at the outset of the method.

Figure 3A:
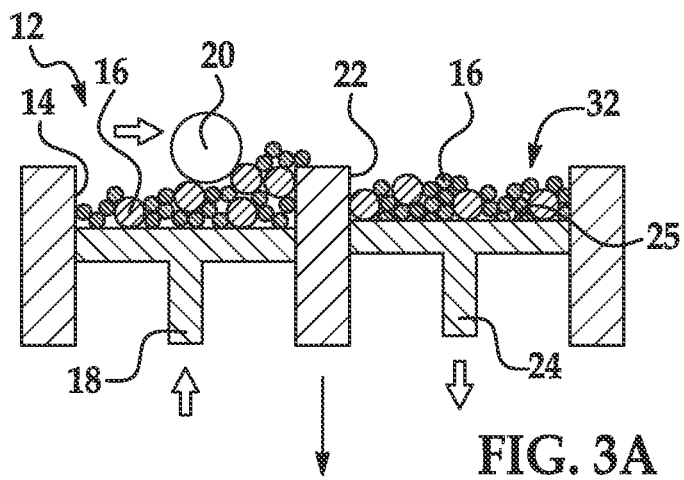
FIGS. 3A-3E are cross-sectional views which together depict still another example of the 3D printing method disclosed herein, where an initial part layer is formed at the outset.

Referring now to FIG. 3A, a precursor layer 32 of the build material 16 may be applied to the fabrication bed 22. It is to be understood that the same type, size, and amount of build material 16 as previously described herein may be used to form the precursor layer 32.

Figure 3B:
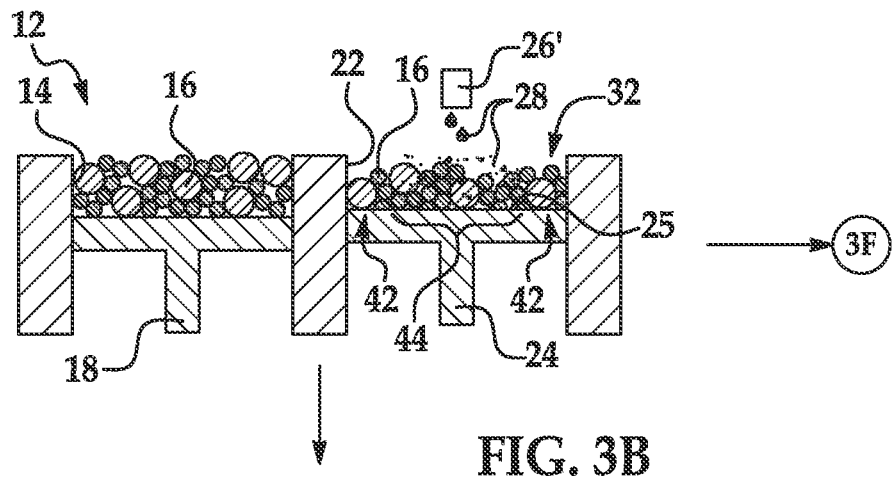

After the precursor layer 32 is applied to the fabrication bed 22, an initial part layer is patterned. The initial part layer is patterned by selectively applying the other liquid functional material 28 on at least a portion(s) 44 of the build material 16 in the layer 10, as shown in FIG. 3B. As illustrated in FIG. 3B, the other liquid functional material 28 may be dispensed from an inkjet printhead 26' as previously described herein. While a single printhead is shown in FIG. 3B, it is to be understood that multiple printheads may be used that span the width of the fabrication bed 22. The printhead 26' may be attached to a moving XY stage or a translational carriage (neither of which is shown) that moves the printhead 26' adjacent to the fabrication bed 22 in order to deposit the other liquid functional material 28 in desirable area(s). In an example, the other liquid functional material 28 in this example is the stabilizing liquid functional material described herein. The use of this material will stabilize the initial part layer that is ultimately formed.

After applying the other liquid functional material 28 to the precursor layer 32, the first layer 10 of the build material 16 may be applied to the precursor layer 32 having the other functional material 28 thereon. An example of the application of the first layer 10 of build material is shown in cross-section at FIG. 3C. In the example shown in FIG. 3C, one layer 10 of the build material 16 has been applied to the precursor layer 32. It is to be understood that the same type, size, and amount of build material 16 as previously described herein (e.g., in reference to FIG. 2A) may be used to form the first layer 10.

Figure 3C:
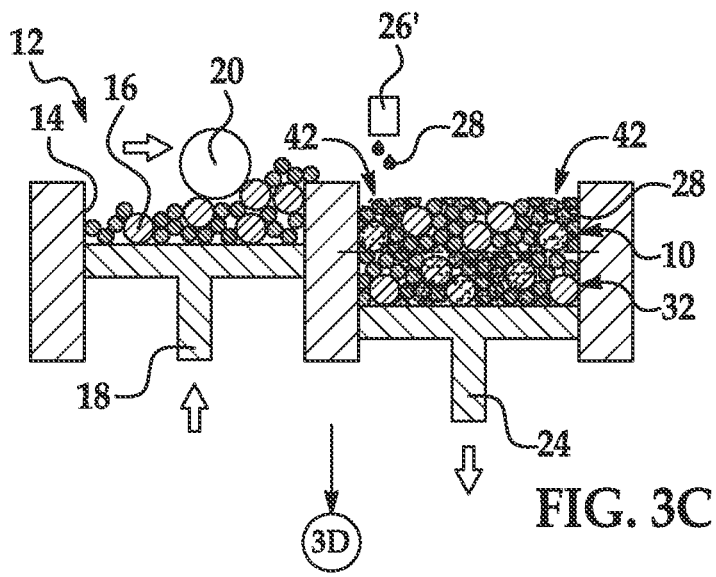

After applying the first layer 10 of the build material 16, the other liquid functional material 28 may be selectively applied on portion(s) 42 of the build material 16 in the first layer 10 to pattern the perimeter of the first layer 10 that is to be formed. FIG. 3C depicts the selective application of the other liquid functional material 28 to define the perimeter at portion(s) 42. This is similar to the description of FIG. 2H.

Figure 3D:
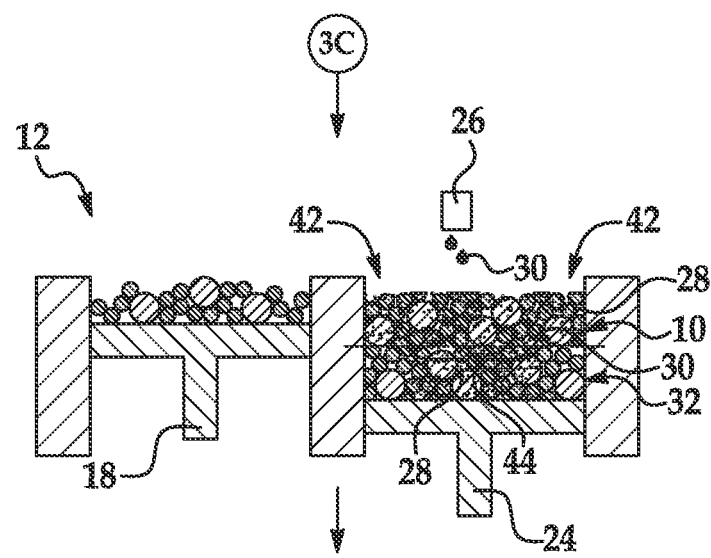

After selectively applying the other liquid functional material 28 to pattern the perimeter of a part layer that is to be formed, the remainder of the part layer is patterned. The remainder of the part layer may patterned by selectively applying the penetrating liquid functional material 30 on at least a portion(s) 44 of the build material 16 within the perimeter portion(s) 42 in the first layer 10, as shown in FIG. 3D. As illustrated in FIG. 3D, the penetrating liquid functional material 30 may be dispensed from the inkjet printhead 26. It is to be understood that the penetrating liquid functional material 30 may be applied to the first layer 10 in the same manner as previously described.

In an example, when the penetrating liquid functional material 30 is selectively applied to the portion(s) 44 on the first layer 10 of the build material 16, the penetrating liquid functional material 30 may also partially penetrate or at least contact the precursor layer 32 adjacent thereto and/or the build material 16 at the perimeter (i.e., where the stabilizing liquid functional material 28 is deposited) of layer 10. The penetration and bleed of the penetrating liquid functional material 30 across the layers 32 to the layer 10 and/or across the portions 44, 42 causes interlayer bonding between the build material 16 of each layer 32, 10 and between the build material 16 at the perimeter of layer 10 and within the perimeter of layer 10 (i.e., between portion 42 and portion 44). Since both the precursor layer 32 and the portions 42 have the stabilizing liquid functional material 28 thereon, it is to be understood that the penetrating liquid functional material 30 may not penetrate much (if at all) beyond the build material 16 having the stabilizing liquid functional material thereon.

Figure 3E:
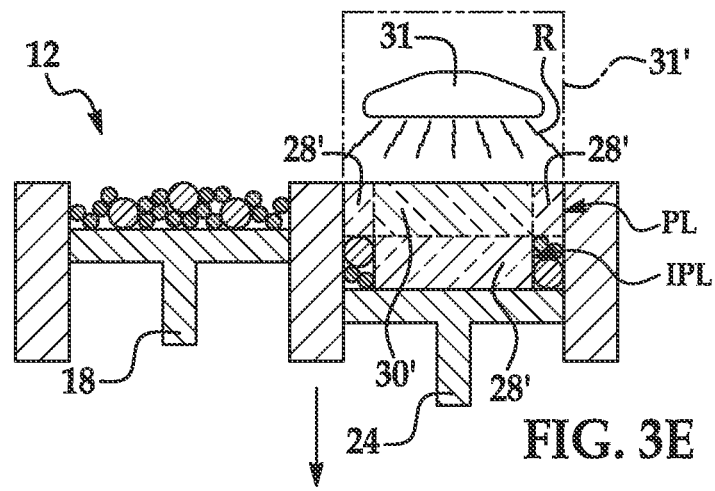

After the penetrating liquid functional material 30 has been applied to portion(s) 44 of the first layer 10 of the build material 16, the first layer 10 and precursor layer 32 may be exposed to electromagnetic radiation R as previously described herein. This radiation R exposure is shown in FIG. 3E. The electromagnetic radiation R may be the same type of electromagnetic radiation R as previously described herein for FIG. 2C.

In the example shown in phantom in FIG. 3E, the electromagnetic radiation source 31' is a microwave. In this example, the precursor layer 32 having the other liquid functional material 28 thereon and the first build material layer 10, having both the liquid functional materials 28 and 30 thereon are removed from the fabrication bed 22 and are placed into the electromagnetic radiation source 31' (i.e., microwave), where electromagnetic radiation R exposure takes place.

In one example, the exposure of the precursor layer 32 to electromagnetic radiation R causes at least partial fusing of the build material 16 in the precursor layer 32 having the other liquid functional material 28 thereon. In addition, the electromagnetic radiation R exposure also causes at least partial fusing of the build material 16 in the first layer 10 having the penetrating liquid functional material 30 and the other functional material 28 thereon. This example results in the formation of the initial part layer IPL and the part layer PL. In this example, the initial part layer IPL is made up of the cured portion(s) 28' of the build material having had the other functional material 28 thereon. The part layer PL is made up of the cured portion(s) 28', 30' having had the other functional material 28 and the penetrating functional material 30 respectively thereon.

After electromagnetic radiation R exposure, any uncured build material 16 may be removed and the 3D object (including cured build material portions 28', 30') is formed.

Prior to performing the electromagnetic radiation R exposure, it is to be understood that FIGS. 3C through 3D may be repeated as many times as desirable to pattern additional part layers (e.g., up to "n" layers until the part shape is obtained, where n is any number) having the perimeter defined by the other liquid functional material 28. In this example of the method, it is to be understood that the penetrating liquid functional material 30 may also be applied to a portion of each additional build material layer in order to pattern at least part of each additional part layer. As an example, the other liquid functional material 28 may be used to stabilize the perimeter of each additional part layer that is created, while the penetrating liquid functional material 30 may be used to enhance the interlayer bonding and the 3D object strength. After a desirable number of layers 10 are patterned in the shape of the 3D object, the electromagnetic radiation R exposure may be performed to simultaneously cure/fuse all of the layers 32, 10 and form the 3D object.

Yet another example of a method for forming a 3D object is depicted in FIGS. 3A, 3B, 3F and 3G. It is to be understood that the build material 16 application and the selective application of the other liquid functional material 28 of this example method are respectively described herein in reference to FIG. 3A and FIG. 3B, and thus are not reiterated.

After applying the other liquid functional material 28 to the precursor layer 32, the first layer 10 of the build material 16 may be applied to the precursor layer 32 having the other functional material 28 thereon. An example of the application of the first layer 10 of build material 16 is shown in cross-section at FIG. 3F. In the example shown in FIG. 3F, one layer 10 of the build material 16 has been applied to the precursor layer 32. It is to be understood that the same type, size, and amount of build material 16 as previously described herein may be used to form the first layer 10.

Figure 3F:
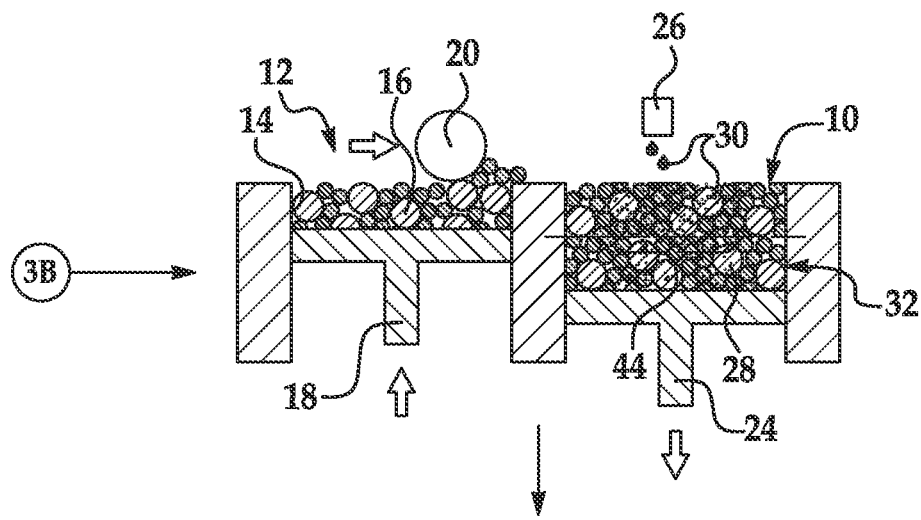

After applying the first layer 10 of the build material 16, a part layer is patterned. The part layer is patterned by selectively applying the penetrating liquid functional material 30 on at least a portion(s) 44 of the build material 16, as shown in FIG. 3F. As illustrated in FIG. 3F, the penetrating liquid functional material 30 may be dispensed from the inkjet printhead 26. It is to be understood that the penetrating liquid functional material 30 may be applied to the first layer 10 in the same manner as previously described.

In an example, when the penetrating liquid functional material 30 is selectively applied to the portion(s) 44 on the first layer 10 of the build material 16, the penetrating liquid functional material 30 may also penetrate or at least contact the precursor layer 32 adjacent thereto. The penetration and bleed of the penetrating liquid functional material 30 across the layers 10, 32 causes interlayer bonding between the build material 16 of each layer 32, 10.

Figure 3G:
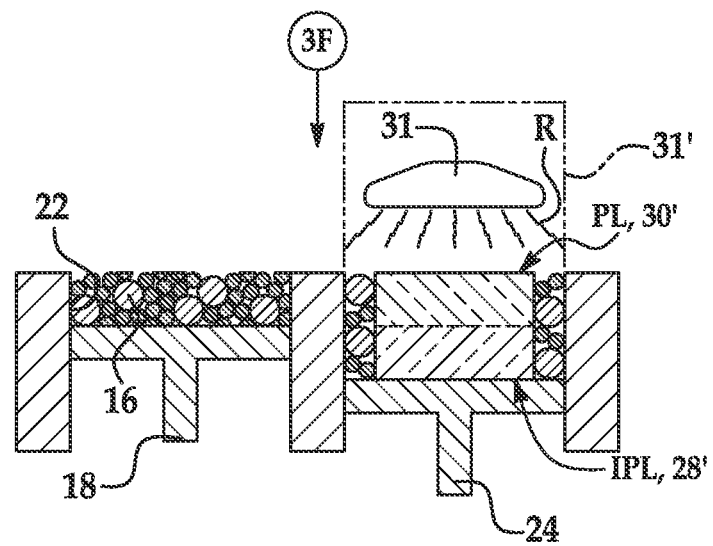

After the penetrating liquid functional material 30 has been applied to portion(s) 44 of the first layer 10 of the build material 16, the first layer 10 and precursor layer 32 may be simultaneously exposed to electromagnetic radiation R as previously described herein. This radiation R exposure is shown in FIG. 3G. The electromagnetic radiation R may be the same type of electromagnetic radiation R as previously described herein.

In the example shown in phantom in FIG. 3G, the electromagnetic radiation source 31' is a microwave. In this example, the precursor layer 32 having the other functional material 28 thereon and the first build material layer 10 having the liquid functional material 30 thereon are removed from the fabrication bed 22 and are placed into the electromagnetic radiation source 31' (i.e., microwave), where electromagnetic radiation R exposure takes place.

The exposure of the precursor layer 32 to electromagnetic radiation R causes at least partial fusing of the build material 16 in the precursor layer 32 having the other functional material 28 thereon. In addition, the electromagnetic radiation R exposure causes at least partial fusing of the build material 16 in the first layer 10 having the penetrating liquid functional material 30 thereon. This example results in the formation of the initial part layer IPL and the part layer PL. In this example, the initial part layer IPL is made up of the cured portion(s) 28' of the build material having had the other functional material 28 thereon. The part layer PL is made up of the cured portion(s) 30' having had the penetrating functional material 30 thereon.

After electromagnetic radiation R exposure, the uncured build material 16 may be removed and the 3D object (including cured build material portions 28', 30') is formed.

Prior to performing the electromagnetic radiation R exposure, it is to be understood that FIG. 3F may be repeated as many times as desirable to pattern additional part layers (e.g., up to "n" layers until the part shape is obtained, where n is any number). In this example of the method, it is to be understood that the penetrating liquid functional material 30 may be applied to at least portion of each additional build material layer in order to pattern at least part of each additional part layer. While not shown, the other liquid functional material 28 may be used to stabilize portion(s) (e.g., the perimeter) of the additional layers 10 of build material 16. After a desirable number of layers 10 are patterned to define the 3D object, the electromagnetic radiation R exposure may be performed to simultaneously cure/fuse all of the layers 32, 10 and form the 3D object.

Figure 4:
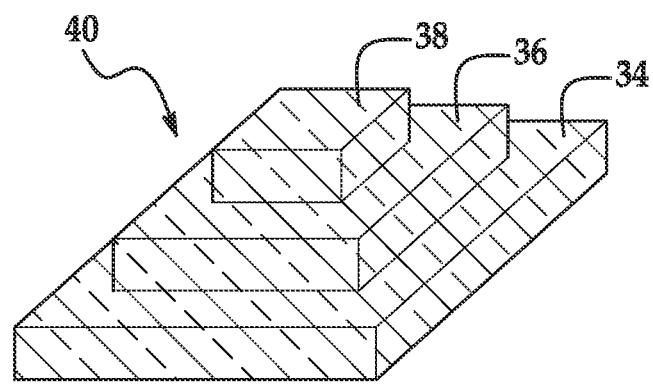
FIG. 4 is a perspective view of an example of a 3D object/part formed from the methods.

An example of the 3D object or part 40 that may be formed by any of the example methods disclosed herein is shown in FIG. 4. The part 40 includes multiple layers 34, 36, 38. In one example, all of the layers 34, 36, 38 are formed of cured portion 30' (i.e., build material having had the penetrating liquid functional material 30 thereon). In another example, the layer 34 may be formed of the cured portion 28' (i.e., build material having had the stabilizing liquid functional material 28 thereon), and the remainder of the layers 36, 38 may be formed of cured portion 30'. In still another example, the layer 34 may be formed of the cured portion 28' (i.e., build material having had the stabilizing liquid functional material 28 thereon), and the remainder of the layers 36, 38 may be formed of both cured portion 30' and cured portion 28', where 28' defined the perimeter of each of the layers 36, 38.

While one example 3D object or part 40 is shown in FIG. 4, it is to be understood that the layers 34, 36, 38 may have any desirable shape and/or thickness and may be the same as or different from any other layer 34, 36, 38 depending upon the size, shape, etc. of the 3D object 40 that is to be formed.

Throughout the various examples of the methods described herein, as additional build material layer(s) 10, 10' are formed, the delivery piston 18 is pushed closer to the opening of the delivery bed 14, and the supply of the build material 16 in the delivery bed 14 is diminished (compare, for example, FIG. 2A at the outset of the method with FIG. 2F after the part layer PL is formed). The fabrication piston 24 is pushed further away from the opening of the fabrication bed 22 in order to accommodate the subsequent layer(s) 10' of build material 16, the selectively applied other liquid functional material 28, and/or the selectively applied penetrating liquid functional material 30.

Additionally, during fabrication, at least some of the build material 16 may remain uncured/unfused after each layer IPL, PL, or APL is formed (see, e.g., FIGS. 2E, 2G, 2I, 3E, and 3G). As such, the 3D object 40 may be at least partially surrounded by the uncured build material 16, even after it is removed from the fabrication bed 22 (e.g., placed in a microwave). When the curing of the 3D object 40 is complete, it may be removed from the fabrication bed 22 or the electromagnetic radiation source 31'. Any remaining uncured/unfused build material 16 may be removed. The uncured build material 16 may be washed and then reused.

As the layers of the 3D object 40 are built up in the Z-direction, uniformity or variations in curing/fusing/sintering may be achieved along the XY plane and/or along the Z axis. Substantially uniform curing/fusing/sintering may be achieved by applying the penetrating liquid functional material 30 within the cross-section of the pattern for each layer and, in some instances, applying the other liquid functional material 28 on the perimeter of each layer of the 3D object to be formed at the same voxel density.

Figure 5:
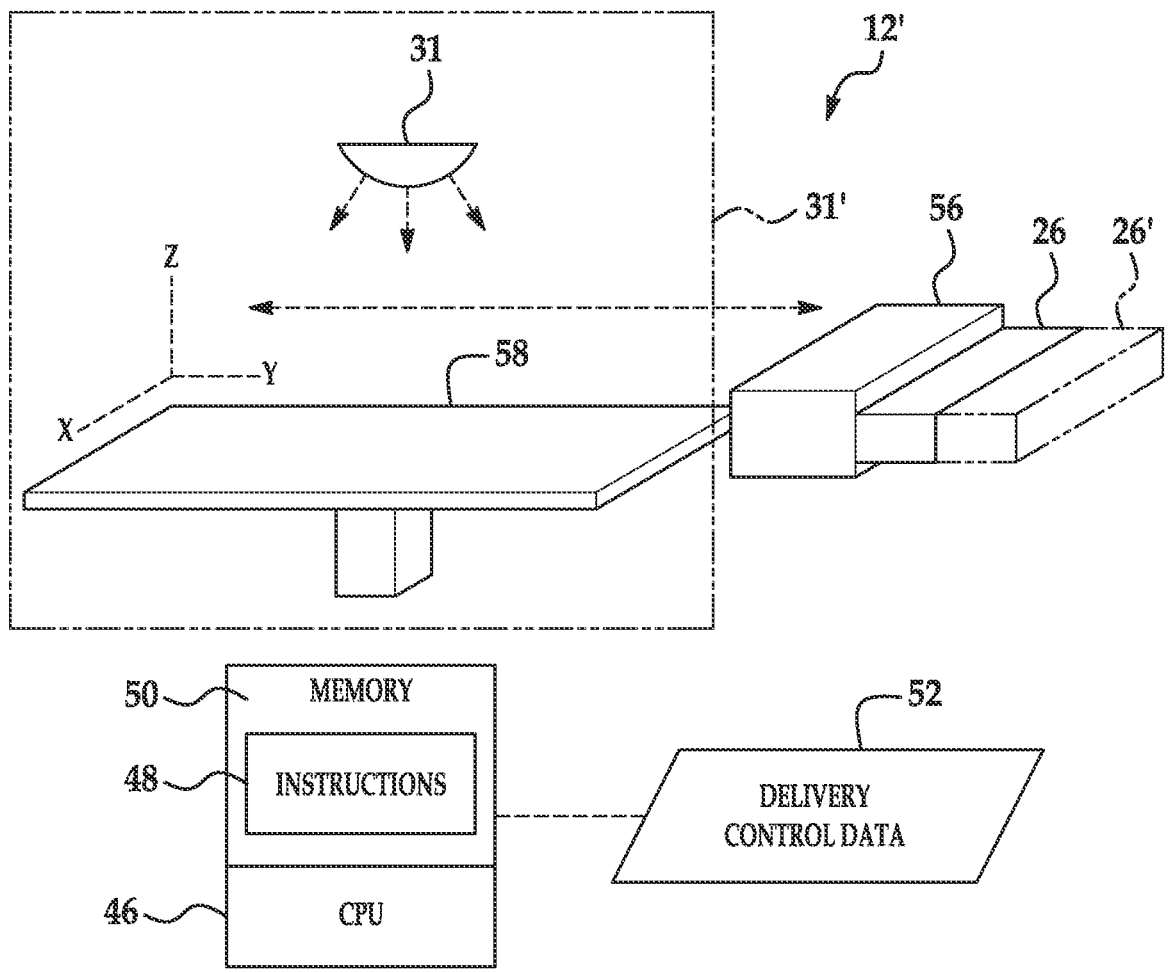
FIG. 5 is a simplified isometric view of an example of a 3D printing system that may be used in an example of the 3D printing method as disclosed herein.

Referring now to FIG. 5, another example of the printing system 12' is depicted. The system 12' includes a central processing unit 46 that controls the general operation of the printing system 12'. As an example, the central processing unit 46 may be a microprocessor-based controller that is coupled to a memory 50, for example via a communications bus (not shown). The memory 50 stores the computer readable instructions 48. The central processing unit 46 may execute the instructions 48, and thus may control operation of the system 12' in accordance with the instructions 48.

In this example, the printing system 12' includes a penetrating liquid functional material distributor 26 to selectively deliver penetrating liquid functional material 30 to portion(s) 44, 44' of the layer(s) 10, 10' (not shown in this figure) of build material 16 provided on a support member 58. In this example, the printing system 12' also includes another liquid functional material distributor 26' to selectively deliver the other liquid functional material 28 to the portion(s) 44 and/or 42 of the layer(s) 32, 10 (not shown in this figure) of build material 16 provided on the support member 58.

The central processing unit 46 controls the selective delivery of the penetrating liquid functional material 30 and the other liquid functional material 28 to the layer(s) 32, 10, 10' of the build material 16 in accordance with delivery control data 52.

In the example shown in FIG. 5, it is to be understood that the distributors 26, 26' are printheads, such as thermal printheads or piezoelectric inkjet printheads. The printheads 26, 26' may be drop-on-demand printheads or continuous drop printheads.

The printheads 26, 26' may be used to selectively deliver the penetrating liquid functional material 30 and the other liquid functional material 28, respectively, when in the form of a suitable fluid. As described above, each of the penetrating liquid functional material 30 and the other liquid functional material 28 includes an aqueous vehicle, such as water, co-solvent(s), etc., to enable it to be delivered via the printheads 26, 26'.

In one example, the printhead 26, 26' may be selected to deliver drops of the penetrating liquid functional material 30 and the other liquid functional material 28 at a resolution ranging from about 300 dots per inch (DPI) to about 1200 DPI. In other examples, the printhead 26, 26' may be selected to be able to deliver drops of the penetrating liquid functional material 30 and the other liquid functional material 28 at a higher or lower resolution. The drop velocity may range from about 5 m/s to about 24 m/s and the firing frequency may range from about 1 kHz to about 100 kHz.

Each printhead 26, 26' may include an array of nozzles through which the printhead 26, 26' is able to selectively eject drops of fluid. In one example, each drop may be in the order of about 10 pico liters (pl) per drop, although it is contemplated that a higher or lower drop size may be used. In some examples, printheads 26, 26' are able to deliver variable size drops.

The printheads 26, 26' may be an integral part of the printing system 12', or it may be user replaceable. When the printheads 26, 26' are user replaceable, they may be removably insertable into a suitable distributor receiver or interface module (not shown).

In another example of the printing system 12', a single inkjet printhead may be used to selectively deliver both the penetrating liquid functional material 30 and the other liquid functional material 28. For example, a first set of printhead nozzles of the printhead may be configured to deliver the penetrating liquid functional material 30, and a second set of printhead nozzles of the printhead may be configured to deliver the other liquid functional material 28.

As shown in FIG. 5, each of the distributors 26, 26' has a length that enables it to span the whole width of the support member 58 in a page-wide array configuration. In an example, the page-wide array configuration is achieved through a suitable arrangement of multiple printheads. In another example, the page-wide array configuration is achieved through a single printhead with an array of nozzles having a length to enable them to span the width of the support member 58. In other examples of the printing system 12', the distributors 26, 26' may have a shorter length that does not enable them to span the whole width of the support member 58.

While not shown in FIG. 5, it is to be understood that the distributors 26, 26' may be mounted on a moveable carriage to enable them to move bi-directionally across the length of the support member 58 along the illustrated y-axis. This enables selective delivery of the penetrating liquid functional material 30 and the other liquid functional material 28 across the whole width and length of the support member 58 in a single pass. In other examples, the distributors 26, 26' may be fixed while the support member 58 is configured to move relative thereto.

As used herein, the term 'width' generally denotes the shortest dimension in the plane parallel to the X and Y axes shown in FIG. 5, and the term 'length' denotes the longest dimension in this plane. However, it is to be understood that in other examples the term 'width' may be interchangeable with the term 'length'. As an example, the distributors 26, 26' may have a length that enables it to span the whole length of the support member 58 while the moveable carriage may move bi-directionally across the width of the support member 58.

In examples in which the distributors 26, 26' have a shorter length that does not enable them to span the whole width of the support member 58, the distributors 26, 26' may also be movable bi-directionally across the width of the support member 58 in the illustrated X axis. This configuration enables selective delivery of the penetrating liquid functional material 30 and the other liquid functional material 28 across the whole width and length of the support member 58 using multiple passes.

The distributors 26, 26' may respectively include therein a supply of the penetrating liquid functional material 30 and the other liquid functional material 28, or may be respectively operatively connected to a separate supply of the penetrating liquid functional material 30 and other liquid functional material 30.

It is to be understood that the printing system 12' may also be formed without the distributor 26' and the other liquid functional material 28, as this fluid may not be used in forming some examples of the 3D object/part 40.

As shown in FIG. 5, the printing system 12' also includes a build material distributor 56. This distributor 56 is used to provide the layer (e.g., layer 10) of the build material 16 on the support member 58. Suitable build material distributors 56 may include, for example, a wiper blade, a roller, or combinations thereof.

The build material 16 may be supplied to the build material distributor 56 from a hopper or other suitable delivery system. In the example shown, the build material distributor 56 moves across the length (Y axis) of the support member 58 to deposit a layer of the build material 16. As previously described, a first layer of build material 16 will be deposited on the support member 58, whereas subsequent layers of the build material 16 will be deposited on a previously deposited (and solidified) layer.

It is to be further understood that the support member 58 may also be moveable along the Z axis. In an example, the support member 58 is moved in the Z direction such that as new layers of build material 16 are deposited, a predetermined gap is maintained between the surface of the most recently formed layer and the lower surface of the distributors 26, 26'. In other examples, however, the support member 58 may be fixed along the Z axis and the distributors 26, 26' may be movable along the Z axis.

Similar to the system 12, the system 12' also includes the electromagnetic radiation source 31 or 31' to apply energy to the deposited layer of build material 16, the penetrating liquid functional material 30, and, in some instances the other liquid functional material 28, to cause the solidification of, in some instances, portion(s) (e.g., 44, 44', 42) of the build material 16. Any of the previously described electromagnetic radiation sources 31, 31' may be used. In an example, the electromagnetic radiation source 31, 31' is a single energy source that is able to uniformly apply energy to the deposited materials, and in another example, the electromagnetic radiation source 31, 31' includes an array of energy sources to uniformly apply energy to the deposited materials.

In the examples disclosed herein, the electromagnetic radiation source 31, 31' is configured to apply energy in a substantially uniform manner to the whole surface of the deposited build material 16. This type of electromagnetic radiation source 31, 31' may be referred to as an unfocused energy source. Exposing the entire layer to energy simultaneously may help increase the speed at which a three-dimensional object may be generated.

While not shown, it is to be understood that the electromagnetic radiation source 31 may be mounted on the moveable carriage or may be in a fixed position.

The central processing unit 46 may control the radiation source 31, 31'. The amount of energy applied may be in accordance with delivery control data 52.

To further illustrate the present disclosure, examples are given herein. It is to be understood that these examples are provided for illustrative purposes and are not to be construed as limiting the scope of the present disclosure.

EXAMPLE

A stabilizing liquid functional material and a penetrating liquid functional material were formed.

An aqueous dispersion of the stabilizing liquid functional material was formed. The dispersion of the stabilizing liquid functional material included 10% by weight of each of sorbitol, 2-pyrrolidinone, and 2-ethyl-2-(hydroxymethyl)-1, 3-propanediol (i.e., trimethylolpropane) as the organic co-solvents, 0.2% by weight of N-Cyclohexyl-2-aminoethanesulfonic acid (CHES) as the pH adjuster, 1% by weight of alumina with a particle size ranging from about 20 nm to about 30 nm, 4% by weight of ST-30LH (silica with a particle size of about 50 nm, Nissan Chemical Industries), 4% (solids) by weight of a carbon black dispersion as the electromagnetic radiation absorber, and a balance of water. The pH of the stabilizing liquid functional material was adjusted to about 10.

An aqueous dispersion of the penetrating liquid functional material was formed. The dispersion of the penetrating liquid functional material included 10% by weight of sorbitol and 12.5% by weight of 2-pyrrolidinone as the organic co-solvents, 0.2% by weight of N-Cyclohexyl-2-aminoethanesulfonic acid (CHES) as the pH adjuster, 0.25% by weight of SURFYNOL® 465 as the surfactant, 1% by weight of alumina with a particle size ranging from about 20 nm to about 30 nm (dispersed with SILQUEST®A-1230), 10% by weight of SNOWTEX® ST-S (silica with a particle size of about 2 nm, Nissan Chemical Industries), 5.5% (solids) by weight of carbon black dispersion as the electromagnetic radiation absorber, and a balance of water. The pH of the stabilizing liquid functional material was adjusted to about 10.

The stabilizing and penetrating liquid functional materials where each loaded into a 12 ng per 1200 dpi pixel printhead and were respectively printed (total of 25 passes) onto an alumina powder bed including a 1:1 ratio of AKP-53 (high purity powder composed of homogeneous α-alumina crystal particles, commercially available from Sumitomo Chemical) and AA-18 (Advanced Alumina-18, commercially available from Sumitomo Chemical). The thickness of the alumina powder was about 100 μm.

After printing/patterning, the depth of the penetration of each of the stabilizing and penetrating liquid functional materials into the build material was measured. The patterned powder was cross sectioned and the penetration depth of the respective liquid functional materials was measured with a caliper.

Figure 6:
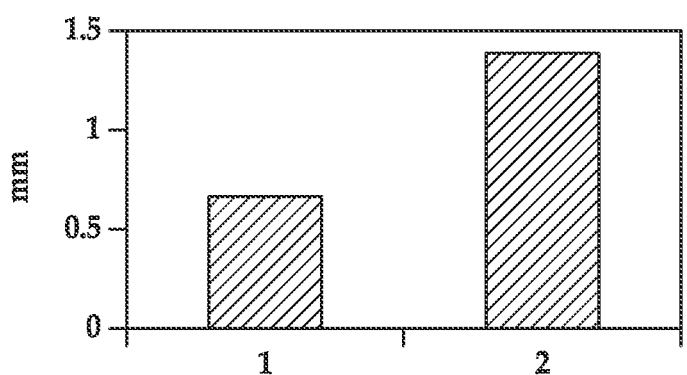
FIG. 6 is a bar graph showing the penetration depth of a penetrating liquid functional material and a stabilizing liquid functional material.

The depth measurement results are shown in FIG. 6. As depicted, the stabilizing liquid functional material (labeled 1 in FIG. 6) penetrated to a depth of 0.67 mm in the build material. It is believed that this is due, at least in part, to the larger particle size of the second ceramic nanoparticles (i.e., the silica nanoparticles) (as compared to the penetrating liquid functional material). The larger silica nanoparticles in the stabilizing liquid functional material effectively fill the voids in the build material (at and near the surface) and work to prevent the migration of pigments or other components in materials applied adjacently thereto. Also as shown in FIG. 6, the penetrating liquid functional material (labeled 2) penetrated to a depth of about 1.4 mm in the build material. It is believed this is due, in part, to the very small second ceramic nanoparticles (i.e., the silica nanoparticles) (as compared to the stabilizing liquid functional material). The penetrating liquid functional material is thus able to more uniformly disperse throughout a layer of build material.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 50° C. to about 2100° C. should be interpreted to include not only the explicitly recited limits of about 50° C. to about 2100° C., but also to include individual values, such as 57° C., 950° C., 1550° C., 2025° C., etc., and sub-ranges, such as from about 70° C. to about 1325° C., from about 60° C. to about 2000° C., etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A three-dimensional (3D) printing method, comprising:
applying a first layer of a build material;
patterning a part layer by selectively applying a penetrating liquid functional material on at least a portion of the first layer, the penetrating liquid functional material including:
a first metal oxide nanoparticle having a particle size ranging from about 0.5 nm up to 10 nm, the first metal oxide nanoparticle present in an amount ranging from about 5% to about 15% by weight based on a total weight of the penetrating liquid functional material;
a second metal oxide nanoparticle having at least one dimension greater than 10 nm, the second metal oxide nanoparticle present in an amount ranging from about 0.25% to about 10% by weight based on the total weight of the penetrating liquid functional material;
an electromagnetic radiation absorber in an amount ranging from about 1% to about 10% by weight based on the total weight of the penetrating liquid functional material;
an organic solvent in an amount from about 5% to about 50% by weight based on the total weight of the penetrating liquid functional material;
a surfactant; and
a balance of water; and
exposing the first layer having the penetrating liquid functional material applied thereon to electromagnetic radiation, whereby the portion of the first layer at least partially fuses to form the part layer.

2. The 3D printing method as defined in claim 1 wherein prior to applying the first layer, the method further comprises:
applying a precursor layer of the build material;
patterning an initial part layer by selectively applying a stabilizing liquid functional material on at least a portion of the precursor layer, the stabilizing liquid functional material including:
a first ceramic nanoparticle in an amount ranging from about 0.1% to about 10% by weight based on a total weight of the liquid functional material;
a second ceramic nanoparticle in an amount ranging from about 0.25% to about 5% by weight based on the total weight of the liquid functional material;
an electromagnetic radiation absorber in an amount ranging from about 1% to about 10% by weight of the liquid functional material;
an organic solvent in an amount from about 5% to about 50% by weight based on the total weight of the stabilizing liquid functional material; and
a balance of water;
and wherein the first layer is applied to the precursor layer having the stabilizing liquid functional material thereon.

3. The 3D printing method as defined in claim 2 wherein after the first layer is applied to the precursor layer and prior to the patterning of the part layer, the method further comprises patterning a perimeter of the part layer by selectively applying the stabilizing liquid functional material on an other portion of the first layer surrounding the at least the first portion of the layer.

4. The 3D printing method as defined in claim 2 wherein the penetrating liquid functional material penetrates the first layer and the precursor layer when it is selectively applied.

5. The 3D printing method as defined in claim 2, further comprising exposing the precursor layer having the stabilizing liquid functional material thereon to the electromagnetic radiation simultaneously with the exposing of the first layer having the penetrating liquid functional material thereon to the electromagnetic radiation.

6. The 3D printing method as defined in claim 1 wherein:
the first metal oxide nanoparticle is silica; and
the second metal oxide nanoparticle is alumina.

7. The 3D printing method as defined in claim 1 wherein prior to the exposing, the method further comprises:
applying an additional layer of the build material on the first layer having the penetrating liquid functional material applied thereon; and
patterning an additional part layer by selectively applying the penetrating liquid functional material on at least a portion of the additional layer;
and wherein the exposing includes simultaneously exposing the first layer and the additional layer, each respectively having the penetrating liquid functional material applied thereon, to the electromagnetic radiation.

8. The 3D printing method as defined in claim 1 wherein after the exposing, the method further comprises:
applying an additional layer of the build material on the part layer;
patterning an additional part layer by selectively applying the penetrating liquid functional material on at least a portion of the additional layer; and
exposing the additional layer having the penetrating liquid functional material applied thereon to the electromagnetic radiation, whereby the portion of the additional layer at least partially fuses to form the additional part layer.

9. The 3D printing method as defined in claim 1, further comprising patterning a perimeter of the part layer by selectively applying a stabilizing liquid functional material on an other portion of the first layer surrounding the at least the portion of the first layer.

10. A three-dimensional (3D) printing system, comprising:
a supply bed to contain a build material;
a build material distributor selected from the group consisting of a wiper blade, a roller, and combinations thereof;
a penetrating liquid functional material distributor including an inkjet printhead;
a penetrating liquid functional material contained in the penetrating liquid functional material distributor, the penetrating liquid functional material having non-Newtonian fluid properties and including:
a first metal oxide nanoparticle having a particle size ranging from about 0.5 nm up to 10 nm, the first metal oxide nanoparticle present in an amount ranging from about 5% to about 15% by weight based on a total weight of the penetrating liquid functional material;
a second metal oxide nanoparticle having at least one dimension greater than 10 nm, the second metal oxide nanoparticle present in an amount ranging from about 0.25% to about 10% by weight based on the total weight of the penetrating liquid functional material;
an electromagnetic radiation absorber in an amount ranging from about 1% to about 10% by weight of the penetrating liquid functional material;
an organic solvent in an amount from about 5% to about 50% by weight based on the total weight of the penetrating liquid functional material;
a surfactant; and
a balance of water;
a central processing unit; and
a non-transitory computer readable medium having stored thereon computer executable instructions to cause the central processing unit to:
utilize the build material distributor to dispense a first layer of the build material; and
utilize the penetrating liquid functional material distributor to selectively dispense the penetrating liquid functional material onto a selected area of the first layer of the build material to pattern a part layer.

11. The 3D printing system as defined in claim 10, further comprising the build material contained within the supply bed, wherein the build material includes ceramic particles.

12. The 3D printing system as defined in claim 10, further comprising:
an other functional material distributor including a second inkjet printhead;
a supply of a stabilizing liquid functional material contained in the other functional material distributor; and
and wherein the non-transitory computer readable medium further has stored thereon computer executable instructions to cause the central processing unit to:
utilize the build material distributor to dispense a precursor layer of the build material before dispensing the first layer of the build material; and
utilize the stabilizing liquid functional material distributor to selectively dispense the stabilizing liquid functional material onto a selected area of the precursor layer of the build material to pattern an initial part layer.

13. The 3D printing system as defined in claim 12 wherein the stabilizing liquid functional material includes:
silica in an amount ranging from about 0.1% to about 10% by weight based on a total weight of the stabilizing liquid functional material;
alumina in an amount ranging from about 0.25% to about 5% by weight based on the total weight of the stabilizing liquid functional material;
an electromagnetic radiation absorber in an amount ranging from about 1% to about 10% by weight based on the total weight of the stabilizing liquid functional material;
an organic solvent in an amount about 5% to about 50% by weight based on the total weight of the stabilizing liquid functional material; and
a balance of water.

14. The 3D printing system as defined in claim 10, further comprising:
an other functional material distributor including a second inkjet printhead;
a supply of a stabilizing liquid functional material contained in the other functional material distributor; and
wherein the non-transitory computer readable medium further has stored thereon computer executable instructions to cause the central processing unit to utilize the other functional material distributor to selectively dispense the stabilizing liquid functional material onto an other selected area of the first layer of the build material to pattern a perimeter of the part layer.

15. The 3D printing system as defined in claim 10, further comprising an electromagnetic radiation source controllable by the central processing unit, wherein the electromagnetic radiation source is selected from the group consisting of a microwave, an ultraviolet (UV) curing lamp, an infrared (IR) curing lamp, an IR light emitting diode, a halogen lamp emitting in the visible and near-IR range, or a laser with a suitable electromagnetic wavelength.

16. The 3D printing system as defined in claim 10 wherein the penetrating liquid functional material distributor is an inkjet device including a fluid container and the printhead, and wherein the penetrating liquid functional material is contained in the fluid container.

17. The 3D printing system as defined in claim 10 wherein the at least one dimension of the second metal oxide nanoparticle ranges from greater than 10 nm to about 250 nm.

18. The 3D printing system as defined in claim 10 wherein:
the first metal oxide nanoparticle is silica;
the second metal oxide nanoparticle is alumina; and
the penetrating liquid functional material has a pH at or above an isoelectric point of the second metal oxide nanoparticle.

19. The 3D printing system as defined in claim 10 wherein the first metal oxide nanoparticle and the second metal oxide nanoparticle are formed of the same material but have a different morphology.

20. The 3D printing system as defined in claim 10 wherein:
the first metal oxide nanoparticle is selected from the group consisting of substantially spherical silica particles, non-spherical silica particles, alumina particles, zinc oxide particles, iron oxide particles, titanium oxide particles, indium oxide particles, zirconium oxide particles, copper oxide particles, cobalt oxide particles, silver oxide particles, and combinations thereof; and
the second metal oxide nanoparticle is selected from the group consisting of substantially spherical silica particles having a diameter of about 50 nm, substantially spherical alumina particles having a particle size ranging about 20 nm to about 30 nm, anisotropic silica, and titanium dioxide.

* * * * *